United States Patent
Iannello et al.

(10) Patent No.: US 10,215,230 B2
(45) Date of Patent: Feb. 26, 2019

(54) PRESSURIZED GAS BEARINGS FOR ROTATING MACHINERY

(71) Applicant: Radiant Physics Inc., Roanoke, VA (US)

(72) Inventors: Victor Iannello, Roanoke, VA (US); Christopher Sortore, Roanoke, VA (US)

(73) Assignee: Radiant Physics Inc., Roanoke, VA (US)

( * ) Notice: Subject to any disclaimer, the term of this patent is extended or adjusted under 35 U.S.C. 154(b) by 0 days.

(21) Appl. No.: 15/711,442

(22) Filed: Sep. 21, 2017

(65) Prior Publication Data

US 2018/0087573 A1    Mar. 29, 2018

Related U.S. Application Data

(60) Provisional application No. 62/399,373, filed on Sep. 24, 2016.

(51) Int. Cl.
| | |
|---|---|
| *F16C 32/06* | (2006.01) |
| *F01D 25/22* | (2006.01) |
| *F01D 25/16* | (2006.01) |
| *F04D 29/056* | (2006.01) |

(52) U.S. Cl.
CPC .......... *F16C 32/0614* (2013.01); *F01D 25/22* (2013.01); *F16C 32/0681* (2013.01); *F01D 25/16* (2013.01); *F04D 29/056* (2013.01); *F05D 2240/51* (2013.01); *F05D 2240/53* (2013.01); *F05D 2240/54* (2013.01); *F16C 32/0607* (2013.01)

(58) Field of Classification Search
CPC ........ F16C 19/54; F16C 19/541; F16C 27/04; F16C 32/0607; F16C 32/0614; F16C 32/0622; F16C 32/0625; F16C 32/0662; F16C 32/0681; F01D 25/164; F04D 29/057; F05D 2250/51; F05D 2250/53; F05D 2250/54
See application file for complete search history.

(56) References Cited

U.S. PATENT DOCUMENTS

| | | | |
|---|---|---|---|
| 3,969,042 A | 7/1976 | Bachler | |
| 4,417,823 A | 11/1983 | Drevet | |
| 4,746,265 A | 5/1988 | Luijten | |
| 4,794,289 A | 12/1988 | Barnaby | |
| 5,073,037 A * | 12/1991 | Fujikawa | ............ F16C 32/0696 384/107 |
| 5,645,354 A | 7/1997 | Heinzl | |
| 5,714,818 A | 2/1998 | Eakman | |
| 5,977,677 A * | 11/1999 | Henry | ................... F01D 25/164 310/90 |
| 7,344,092 B1 | 3/2008 | Kim | |

(Continued)

*Primary Examiner* — Phillip A Johnson
(74) *Attorney, Agent, or Firm* — Michael Haynes PLC; Michael N. Haynes

(57) ABSTRACT

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, positioning a rotating shaft within a machine via an externally-pressured gas bearing system.

19 Claims, 15 Drawing Sheets

(56) References Cited

U.S. PATENT DOCUMENTS

| | | | | |
|---|---|---|---|---|
| 7,836,601 B2* | 11/2010 | El-Shafei | ............... | F16C 17/02 |
| | | | | 29/407.09 |
| 8,106,556 B2* | 1/2012 | Brunet | ............... | F16C 27/04 |
| | | | | 310/90 |
| 8,408,806 B2* | 4/2013 | Tecza | ............... | F16C 27/066 |
| | | | | 384/405 |
| 9,024,494 B2 | 5/2015 | Hawkins | | |
| 9,416,820 B2* | 8/2016 | Ertas | ............... | F16C 32/0662 |
| 9,695,871 B2* | 7/2017 | Krebs | ............... | F16C 32/0402 |
| 2009/0279815 A1 | 11/2009 | Hunter | | |
| 2009/0304313 A1* | 12/2009 | Ertas | ............... | F16C 17/035 |
| | | | | 384/99 |
| 2012/0020596 A1 | 1/2012 | Dupont | | |
| 2014/0254962 A1* | 9/2014 | Tecza | ............... | F16C 32/0402 |
| | | | | 384/91 |
| 2017/0298772 A1* | 10/2017 | Mook | ............... | F04D 29/0513 |

* cited by examiner

PRESSURIZED GAS BEARINGS FOR ROTATING MACHINERY

CROSS-REFERENCES TO RELATED APPLICATIONS

This application claims priority to, and incorporates by reference herein in its entirety, U.S. Provisional Patent Application 62/399,373, filed 24 Sep. 2016.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Rotating machinery such as compressors, pumps, turbines, motors, and/or generators can employ oil-free bearings to improve efficiency, reduce maintenance, and/or improve reliability. Two bearing types that can be used are magnetic bearings and gas bearings.

Gas bearings can have a number of features that make them particularly attractive for many applications. Primary is the simplicity of the bearing system. Without the need for electromagnets, sensors, control electronics, amplifiers, and electrical cabling, gas bearings can reduce the complexity and/or the cost of a rotating machine.

There are two major classes of gas bearings:
Self-Acting. Also known as hydrodynamic (for liquid lubricants) or aerodynamic (for gas lubricants), the stiffness and damping forces are created by a wedged-shape clearance formed by a shaft journal that is eccentric to either pivoting pads or a foil. Because bearing forces are created by shaft rotation, each start-stop cycle can result in wear, which can necessitate special coatings. The fluid film effect that creates the bearing stiffness can require that very small clearances are maintained.

Externally-pressurized. Also known as hydrostatic (for liquid lubricants) or aerostatic (for gas lubricants), the stiffness and damping forces are created by introducing an external source of gas into the clearance between the outer diameter (OD) of the shaft journal and the inner diameter (ID) the bearing. In order to create stiffness, there can be a flow restriction before the gas enters the clearance. This flow restriction can be provided by a porous medium such as carbon and/or one or more inlet feedholes (orifices).

To achieve stability, a bearing system can provide damping and/or stiffness. The main source of damping for a gas bearing can be the force generated by the "squeeze film" effect, which can be proportional to velocity and/or inversely proportional to the cube of the clearance. Gas bearings can utilize very small clearances between the shaft OD and the bearing ID to generate sufficient damping for stability, such as, radial clearances less than 0.0002 in (5 µm).

The use of small clearances gas bearings can make them:
Expensive to manufacture due to the high precision that can be required;
Intolerant to gas contamination; and/or
Intolerant to changes in temperature.

Certain exemplary embodiments can provide an externally-pressured gas bearing that is specifically configured for rotating machinery. Because the damping can be created by features in the bearing that need not rely upon the squeeze film effect, larger clearances can be employed, and/or the cost, robustness, and/or performance can be improved. In certain exemplary embodiments, the gas bearing can be configured to be suitable for a variety of gases, including air, helium, hydrocarbons, steam, and/or refrigerants, and/or can be used in rotating machinery.

Figure 1:
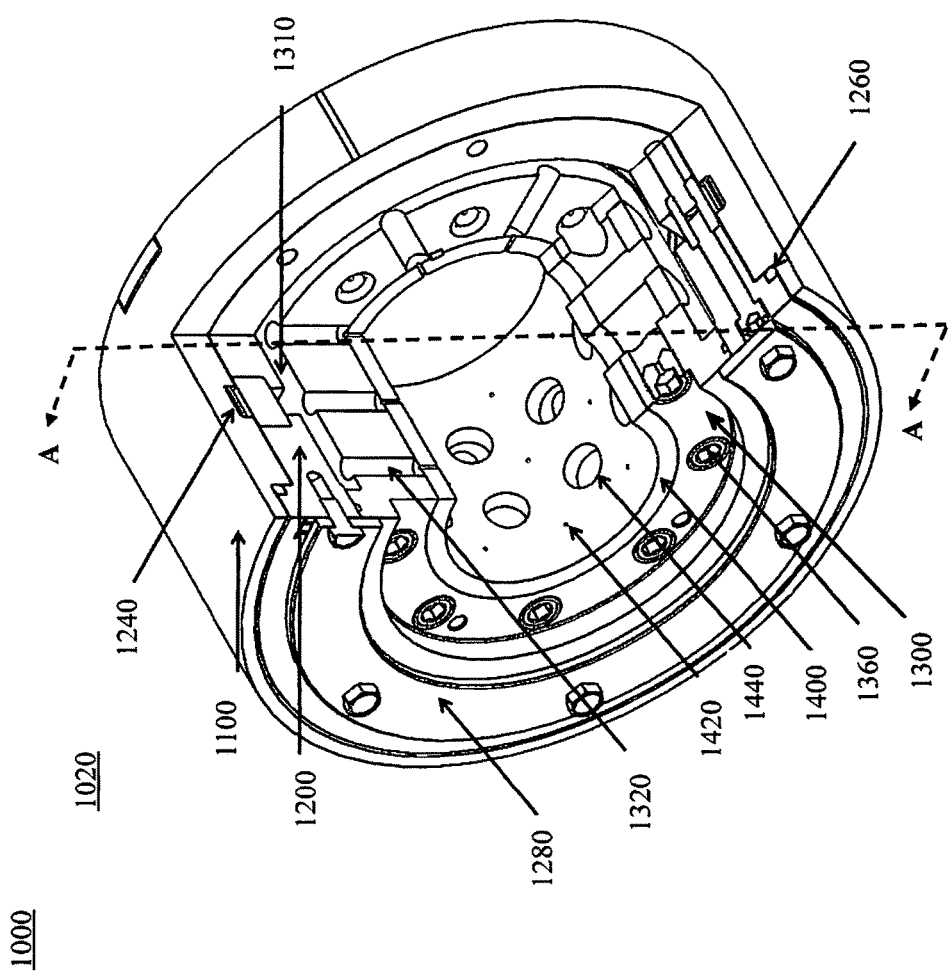
FIG. 1 is a perspective view of an exemplary embodiment of a system.

FIG. 1 shows a cut-away of an exemplary embodiment of a system 1000 comprising a radial (journal) bearing 1020 that can be used to provide lateral positioning and/or support of a rotating shaft. The parts shown include an outer housing 1100, inner housing 1200, frame 1300, liner 1400, wave spring 1240, elastomer O-ring 1260, and retainer 1280. Features in these parts related to the flow of gas include the annular plenum 1310 in frame 1300, supply holes 1320 in frame 1300, feedholes 1420 in the liner 1400, and exhaust orifices 1360 in the frame 1300.

Figure 2:
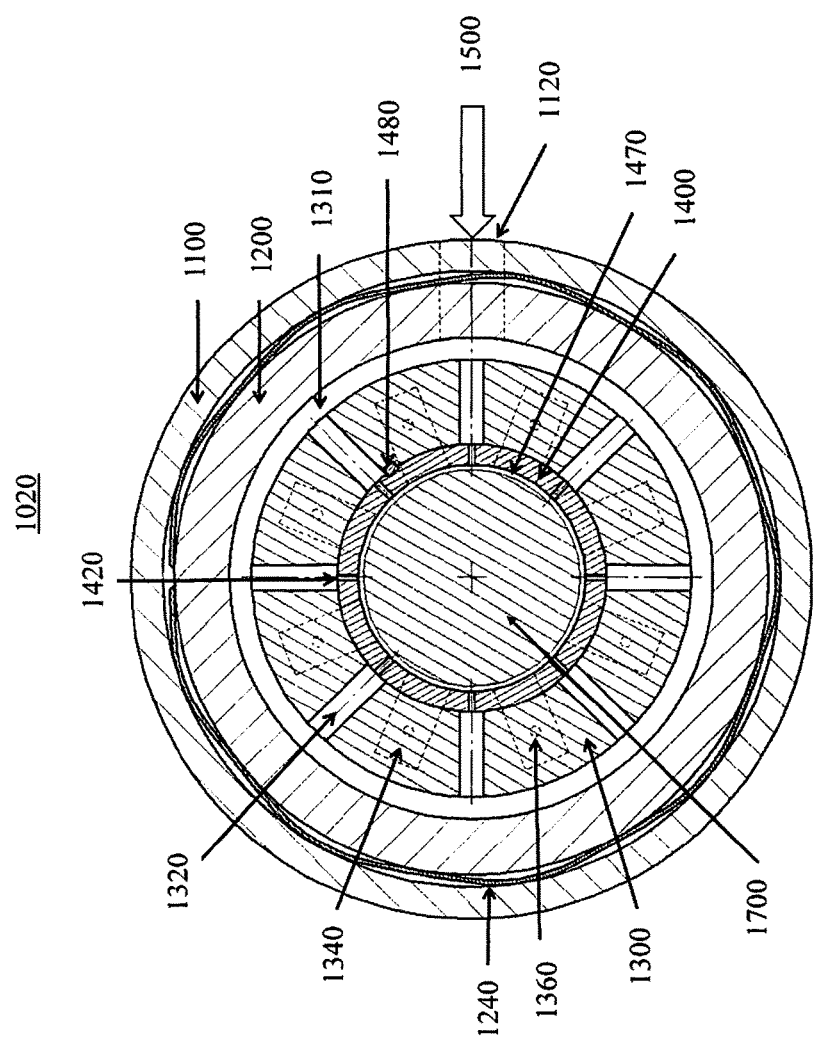
FIG. 2 is an longitudinal cross-sectional view of an exemplary embodiment of a system.

FIG. 2 provides a cross-section (taken at section A-A) of the exemplary embodiment shown in FIG. 1, and is used to describe its operation. A shaft 1700 can be supported and/or positioned by pressurized gas 1500 at a pressure $P_s$ that can be introduced to the bearing 1020 through an inlet port 1120, pass through the outer housing 1100 and/or inner housing 1200, and/or then be distributed substantially circumferentially in the substantially annular plenum 1310 of the frame 1300. The pressurized gas 1500 can leave the annular plenum 1310 and/or can flow through the frame 1300 and/or towards the shaft 1700 by entering any of multiple supply holes 1320 in the frame 1300 and/or into any of multiple feedholes 1420 in the liner 1400 that can be spaced, potentially substantially evenly, around the shaft 1700. After leaving the feedholes 1420, the gas 1500 can flow into the clearance 1470 between the liner 1400 and the shaft 1700 and/or expand outward from the feedholes 1420. Some of the expanding gas 1500 in the clearance 1470 can enter the liner damping apertures 1440 and/or the frame damping cavities 1340 and/or exit the bearing 1020 through exhaust orifices 1360. The gas 1500 that does not flow into the damping apertures 1440 and/or damping cavities 1340 can flow substantially axially in the clearance 1470 and/or exit the bearing 1020 out one or more of the bearing ends.

The liner 1400 can be substantially secured in the frame 1300 using an alignment pin 1480, which can ensure substantial alignment of the supply holes 1320 and/or the feedholes 1420, and/or can resist and/or prevent rotation of the liner 1400 relative to the frame 1300. The inner housing 1200 can be positioned in the outer housing 1100 using a wave spring 1240. When a shaft 1700 is supported by multiple bearings 1020, the compliance offered by the wave spring 1240 can reduce the required precision of the alignment of the bearings 1020. The wave spring 1240 can provide damping for lateral displacement of the shaft 1700 because of the potential frictional force between the face of the wave spring 1240 and/or the inner housing 1200 and/or the outer housing 1100.

Figure 3:
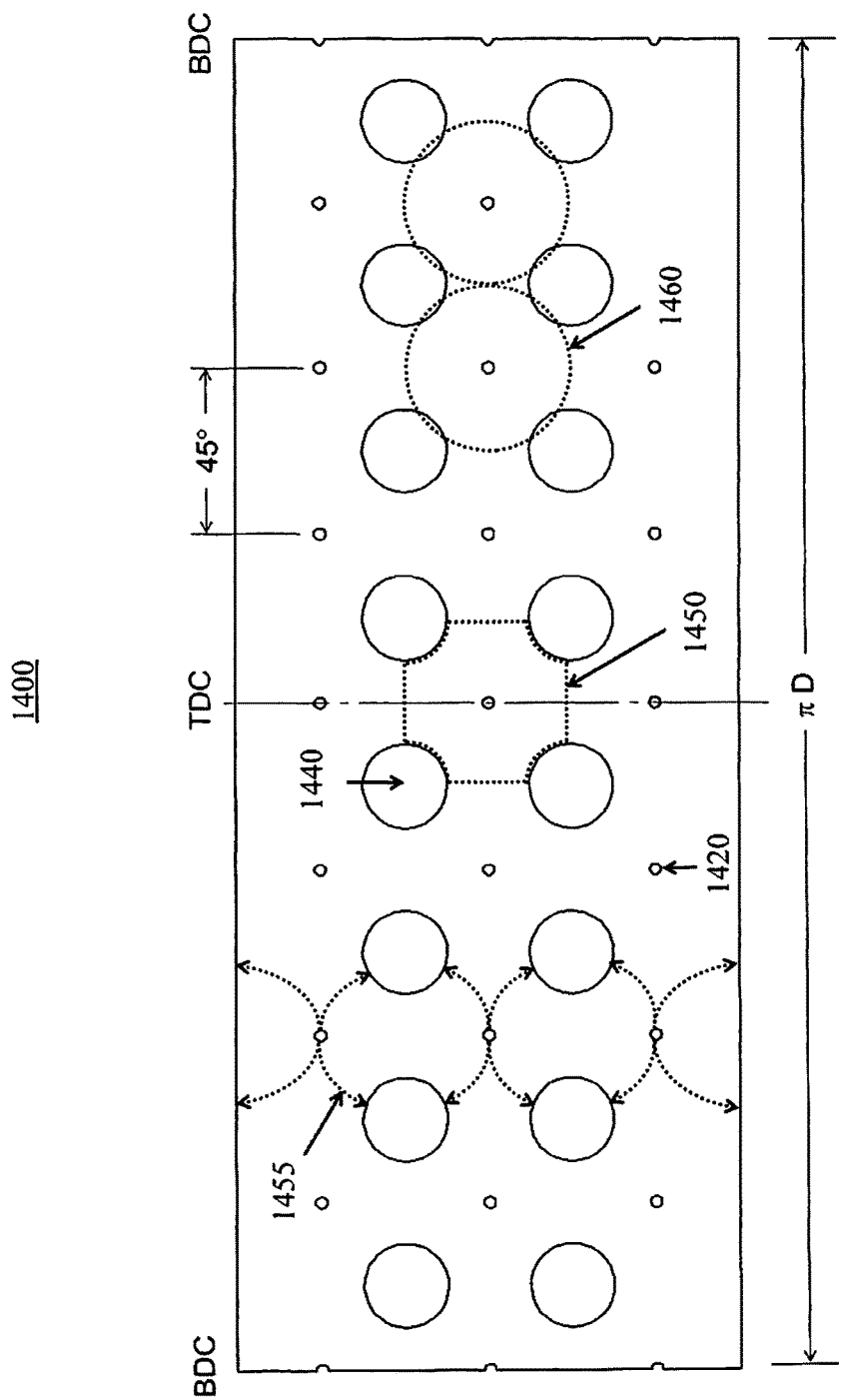
FIG. 3 is a flattened view of an exemplary embodiment of a liner system.

FIG. 3 shows an exemplary embodiment of an arrangement of feedholes 1420 and liner damping apertures 1440 at the inner diameter of the liner 1400, the liner 1400 portrayed as "unrolled" and/or "flattened" onto a plane for ease of understanding. In this particular arrangement, twenty-four feedholes 1420 are shown spaced around the shaft (not shown) and arranged in three rows along the shaft, each row comprising eight feedholes 1420 substantially equally spaced circumferentially around the shaft. Sixteen liner damping apertures 1440 are spaced around the shaft and arranged in two rows along the shaft, each row comprising eight liner damping apertures 1440 that are substantially equally spaced circumferentially around the shaft.

FIG. 3 also shows a potential direction of the flow of gas from this particular arrangement of feedholes 1420 in liner 1400. For the middle row of feedholes 1420, the gas can exit from a feedhole 1420 and/or flow to one of the four liner damping apertures 1440 surrounding it. For the end rows of feedholes 1420, about half the gas from a feedhole 1420 can flow to one of two liner damping apertures 1440 and about half can flow out the end of the bearing. Each liner damping aperture 1440 can receive a flow that is approximately equal to the flow from one of the feedholes 1420. The flow of gas into the liner damping apertures 1440 can provide stability to the bearing, as described below.

Restoring Force

Referring to FIGS. 2 and 3, as the shaft 1700 is displaced from its center position towards a feedhole 1420, the clearance 1470 near that feedhole 1420 can reduce, and/or the gas 1500 in the clearance 1470 surrounding that feedhole 1420 can rise in pressure. Simultaneously, as the shaft 1700 moves away from the substantially diametrically opposed feedhole, the clearance near that feedhole can increase, and/or the gas 1500 in the clearance surrounding that feedhole 1420 can lower in pressure. Therefore, as the shaft 1500 is displaced from its center position, the gas pressure in the clearance 1470 can create a restoring force that can vary with the amount of displacement.

To understand the restoring force that can be produced by the gas pressure in the clearance 1470 surrounding the shaft 1700, we can consider the force on the shaft 1700 that can be exerted by the gas 1500 in the vicinity of an imaginary rectangular "pad" 1450, such as shown in FIG. 3. Because the clearance 1470 can be much smaller than the dimensions of the pad 1450, for a given pad 1450, we can ignore the curvature of the shaft 1700 and/or surfaces of liner 1400 and model the liner 1400 and the surface of shaft 1700 as parallel plates. Furthermore, we can approximate the geometry of pad 1450 as an equivalent imaginary circular pad 1460 of equal area, as shown in FIG. 3. The diameter of the circular pad 1460 can be about equal to the spacing between the feedholes 1420, and/or the radius of the circular pad 1460 can be substantially defined by, for example, the distance from a middle row feedhole 1420 to its nearest liner damping aperture 1440.

Figure 4:
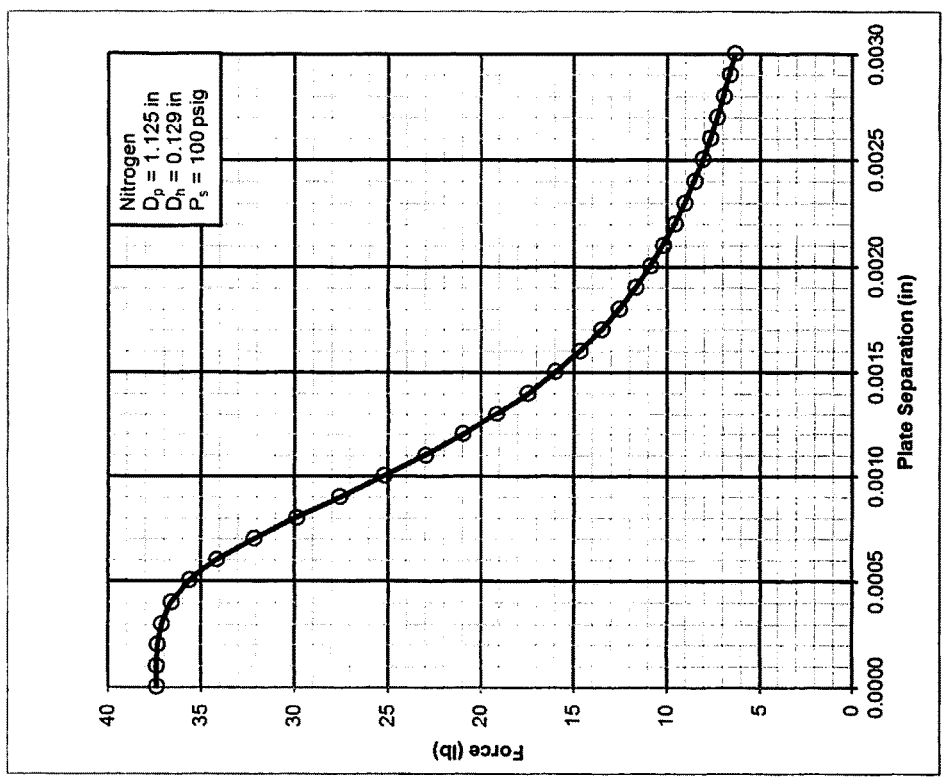
FIG. 4 is a graph of force vs. plate separation for an exemplary embodiment of a system.

For a chosen gas 1500, the force developed between parallel circular plates with a central feedhole 1420 can be modeled as a function of the supply pressure, gas properties, pad diameter, feedhole diameter, and/or separation distance between the plates. This relationship can be determined experimentally and/or numerically. FIG. 4 shows the result of a calculation for room temperature nitrogen at a supply pressure of 100 psig, a pad diameter $D_p$=1.125 in, and a feedhole diameter $D_h$=0.129 in. This would correspond to radial bearing with shaft diameter $D_s$=2.865 in. The maximum force developed is approximately 37.4 lb for a plate separation of approximately 0.0000 in, and this falls to about 6.4 lb for a plate separation of approximately 0.003 in. The average pad pressure at maximum force is about 37.7 psi, corresponding to about 38% of the supply pressure.

Figure 5:
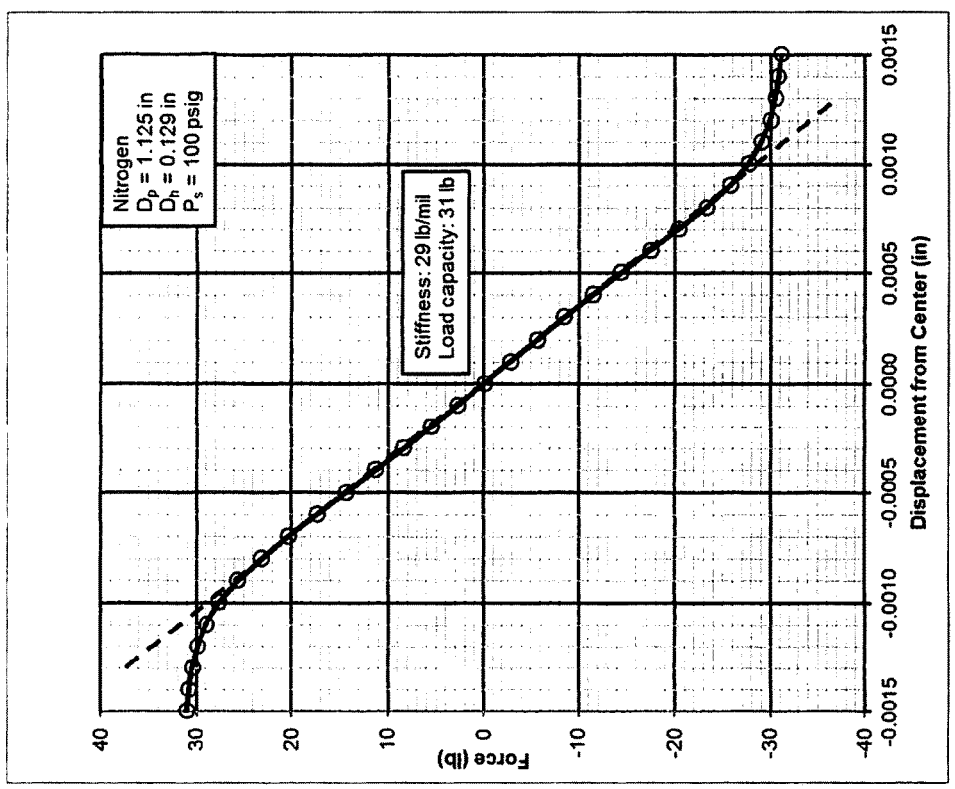
FIG. 5 is a graph of force vs. displacement for an exemplary embodiment of a system.

A complete radial bearing 1020 can be configured with multiple feedholes 1420, and/or the net force on the shaft 1700 can be the resultant force from the contributions of each pad 1450, 1460. FIG. 5 shows the net contribution that can be provided by an exemplary embodiment that comprises two opposing pads located across the shaft diameter and with a nominal shaft clearance of approximately 0.0015 in. The force can be substantially symmetric for a displacement of the shaft to either side of the center position. The force can rise to approximately 31.1 lb when the shaft contacts the liner, and the stiffness when the shaft is near center can be about 29,000 lb/in (29 lb/mil). When considering a bearing configured with a shaft diameter $D_s$=2.865 in and 24 feedholes arranged in 3 rows, the load capacity can be about $F_b$=187 lb with a stiffness of about $K_p$=174,000 lb/in (174 lb/mil). The load capacity and stiffness can be higher if the supply pressure were increased.

Damping Cavities

To achieve stability at high speed, the bearing system can have sufficient damping so that when a resonant mode is excited, the shaft vibration remains less than the available clearance. For certain embodiments, the main contributor to damping relative motion between the shaft and bearing liner can be squeeze film forces in the clearance, which can vary inversely as the cubed power of clearance. The small value of viscosity for typical gases (on the order of $1.5 \times 10^{-5}$ Pa-s) can require that the clearances between the shaft and bearing are small for adequate stability at high speeds. However, small clearances can increase the manufacturing cost, reduce the tolerance to contaminants, and/or require attention to control of operating temperatures. The strong dependence on the performance of such gas bearings on geometrical dimensions that can be hard to precisely control can make it difficult to predict the performance of most gas bearings. These constraints can limit the use of these gas bearings for many applications.

In certain exemplary embodiments, damping forces can be developed that are not related to the squeeze film effect. Rather, motion of the shaft can create a time-varying pressure in the damping cavity (liner damping aperture and/or frame damping cavity) that can tend to damp vibration.

When the shaft is substantially centered in the bearing and motionless, there can be a substantially steady flow of gas into the damping cavity, which then can exit the bearing through the exhaust orifice. As shown in FIG. 3, about one-quarter of the flow of each feedhole 1420 can flow into a given damping cavity (liner damping aperture 1440 and/or frame damping cavity 1340). Since each damping cavity can be surrounded by four feedholes, the flow into a damping cavity can be approximately equal to the nominal flow out a single feedhole.

The gas can be supplied to the bearing at a supply temperature $T_s$ and pressure $P_s$. As such, the enthalpy $h_s$ and entropy $s_s$ at the supply conditions can be determined by the thermodynamic equations of state:

$$h_s = h(T_s, P_s); \quad s_s = s(T_s, P_s) \tag{1}$$

For a properly configured bearing, the flow out a feedhole can be choked, where the minimum area for the flow path can be the annulus defined by the perimeter of the feedhole and the gap between the feedhole and shaft journal. Under choked conditions, the gas can accelerate to approximately its sonic speed $a_c$ as the gas exits the feedhole. As such, the thermodynamic properties of the gas as it exits the feedhole can be modeled as follows:

$$h_c = h_s - a_c^2/2; \quad a_c = a(h_c, s_s); \quad \rho_c = \rho(h_c, s_s) \tag{2}$$

Note that without an analytical expression for the sonic speed as a function of enthalpy and entropy, the values of $h_c$ and $a_c$ can be modeled and/or determined iteratively.

The expansion of the gas through the bearing to the exit pressure $P_e$ can be modeled as an adiabatic, isenthalpic process (for an ideal gas, the gas exits the bearing at the same temperature as it was supplied to the bearing). Therefore, the density at the exit can be—determined by:

$$\rho_e = \rho(h_s, P_e) \tag{3}$$

With the gas properties determined for choked flow out the feedhole and at the exit of the bearing, we can use these properties to model how the pressure in the damping cavity varies with shaft position, and ultimately how the damping cavities stabilize the bearing.

We can start by considering a shaft with a nominal radial clearance c, and displacement x from the center position away from a feedhole. Recognizing that the flow is choked, the modeled flowrate is $$\dot{m}_h = \rho_c a_c \pi D_h (c+x) \tag{4}$$

Recognizing that the pressure in the cavity can be only slightly higher than the exit pressure, i.e., the pressure drop through the exhaust orifice can be small, we can develop equations to model the volumetric flow $Q_v$ into the damping cavity volume, the volumetric flow $Q_e$ exiting the damping cavity volume, and the damping cavity pressure $P_v$ as follows:

$$Q_v = \dot{m}_h / \rho_e \tag{5}$$

$$P_v = P_e + \frac{\rho_e Q_e^2}{2 C_d^2 A_e^2} \tag{6}$$

$$\frac{dP_v}{dt} = P_e (Q_v - Q_e) / V_c \tag{7}$$

where the damping cavity has a volume $V_c$ and the gas in the damping cavity exhausts out an orifice with area $A_e$ and discharge coefficient $C_d$.

Under steady conditions with no load on the shaft, i.e., a centered shaft, these model equations reduce to $$\dot{m}_{h,o} = \rho_c U_c \pi D_h c \tag{8}$$

$$Q_{v,o} = \dot{m}_{h,o} / \rho_e \tag{9}$$

$$P_{v,o} = P_e + \frac{\rho_e Q_{e,o}^2}{2 C_d^2 A_e^2} \tag{10}$$

$$Q_{e,o} = Q_{v,o} \tag{11}$$

For small perturbations of shaft displacement about this condition, the equations can be linearized as $$\tilde{\dot{m}}_h = \dot{m}_{h,o} \tilde{x} / c \tag{12}$$

$$\tilde{Q}_c = Q_{c,o} \tilde{x} / c \tag{13}$$

$$\tilde{P}_v = 2(P_{v,o} - P_e) \tilde{Q}_e / Q_{e,o} \tag{14}$$

$$\frac{d\tilde{P}_v}{dt} = P_e (\tilde{Q}_v - \tilde{Q}_e) V_c \tag{15}$$

We can define the exhaust orifice flow resistance $R_e$ and damping cavity capacity $C_v$ as:

$$R_e = 2(P_{v,o} - P_e) / Q_{e,o} \tag{16}$$

$$C_v = V / P_e \tag{17}$$

where a time constant $\tau$ is defined as $$\tau = R_e C_v \tag{18}$$

Recognizing that the force on the shaft due to the pressure in the cavity can be modeled as $$\tilde{F}_v = \tilde{P}_v A_v \tag{19}$$

we can define a negative stiffness due to a damping cavity as $$K_v \tilde{F}_v / \tilde{x} = \tilde{P}_v A_v / \tilde{x} \tag{20}$$

which under steady conditions becomes $$K_{v,o} = R_e Q_{e,o} A_e / c \tag{21}$$

After making the substitutions and solving the first-order differential equation for stiffness in the complex plane, we find that for sinusoidal periodic motion with an angular frequency ω, the negative stiffness due to a damping cavity can be modeled as $$K_v = \frac{K_{v,o}}{1 + j\omega\tau} \tag{22}$$

This equation shows that the pressure wave in the damping cavities can be delayed relative to shaft motion and/or can be attenuated at higher frequencies.

An exemplary bearing can comprise multiple cavities. For the bearing geometry considered above, which includes 16 damping cavities arranged as two rows of eight equally spaced damping cavities, the net effect can be modeled as about 8 times that of a single damping cavity. The total unbalance stiffness introduced by all the damping cavities can be written as $$K_u = \frac{K_{u,o}}{1 + j\omega\tau} \tag{23}$$

Considering the entire bearing, the combined effect of the positive stiffness produced by the pressure in the pads and the negative stiffness produced by the damping cavities can be modeled as $$K_b = K_p - \frac{K_{u,o}}{1 + j\omega\tau} \quad (24)$$

The negative stiffness can reduce in magnitude as the frequency of the shaft displacement increases according to the equation:

$$|K_u| = 1/\sqrt{1+(\omega\tau)^2} \quad (25)$$

with a corresponding phase delay modeled by $$\phi_u = \tan^{-1}(\omega\tau) \quad (26)$$

Therefore, the direct stiffness and damping for the bearing can be modeled respectively as $$K_{xx} = Re\{K_b\} = K_p - |K_u|\cos\phi_u \quad (27)$$

$$C_{xx} Im\{K_b\}/\omega = |K_u|\sin\phi_u/\omega \quad (28)$$

and the stabilizing phase lead introduced by the damping cavities in the bearing can be modeled as $$\phi_b = \tan^{-1}[Im\{K_b\}/Re\{K_b\}] \quad (29)$$

The previous analysis shows that:
To achieve static stability, the positive stiffness offered by the pressure in the pad surrounding the feedhole can exceed the negative stiffness produced by the pressure in the damping cavity.
Under dynamic conditions, the compressibility of the gas in the damping cavity volume can create a delay in the time-varying pressure relative to shaft motion and/or a reduction in amplitude of pressure. If the time constant of this delay is properly chosen, the damping cavities can enhance dynamic stability, i.e., provide positive damping.

Example: Consider, applying this model, a bearing configured with a pad stiffness of $K_p$=200,00 lb/in, an unbalance stiffness of $K_{u,o}$=100,000 lb/in, and a time constant of $\tau$=1 ms for the damping cavities. For shaft motion at a frequency of 159 Hz (1000 rad/s), we have $|K_u|$=70,711 lb/in, and $\phi_u$=45°. Therefore, $K_{xx}$=200,000−70,711 cos (45°)=150,000 lb/in and $\omega C_{xx}$=70,711 sin (45°)=50,000 lb/in. The force produced by the bearing will lead the shaft displacement by $\phi_b$=tan$^{-1}$ (50,000/150,000)=18.4°. For the same bearing without the damping cavities, the bearing can be only marginally stable, and/or can be unlikely to be stable at high speeds.

Monitoring Loads and Shaft Clearance by Measuring Pressure in Damping Cavity

As the shaft moves away from a damping cavity, its pressure can fall and/or the pressure in the diametrically opposed cavity can rise. By measuring the difference in pressure between the two damping cavities, the quasi-steady, co-incident displacement of the shaft caused by load can be determined. The change in nominal clearance caused by thermal effects and/or centrifugal growth of the shaft can be determined by measuring the mean pressure in the damping cavities.

Figure 6:
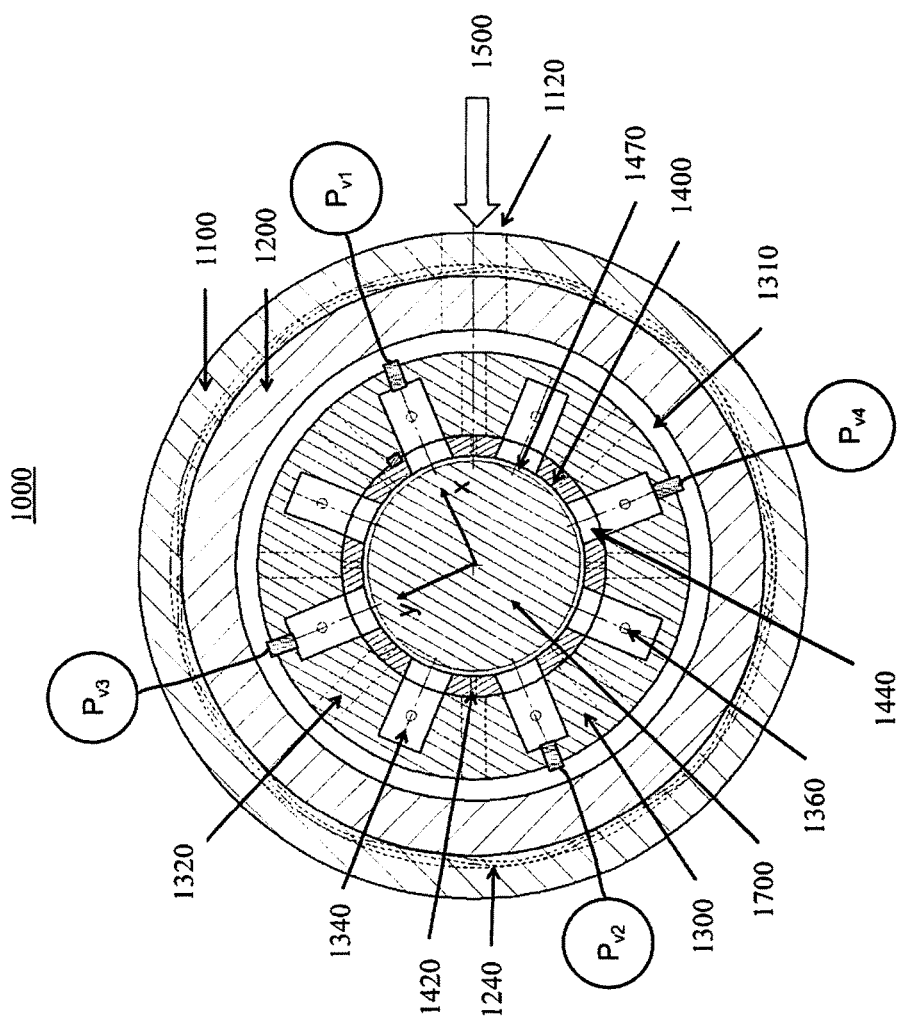
FIG. 6 is a longitudinal cross-sectional view of an exemplary embodiment of a system.

FIG. 6 shows an exemplary embodiment that illustrates how pressure taps 1520 can be used to measure the pressure in four damping cavities 1340 arranged along orthogonal axes labeled x and y. The pressure measurements can be made by internal pressure sensors 1540 in the bearing 1020 and passing electrical wires from these pressure sensors 1540 through the inner housing 1200 and outer housing 1100 and/or by tapping the damping cavities 1340 with small ducts that are passed through the inner housing 1200 and outer housing 1100 and then measuring the pressures with sensors 1540 that are located external to the bearing 1020. The measurement can be used to monitor the performance of the bearing 1020 to help ensure, for instance, that the bearing 1020 is not overloaded by excessive force. In operation, if the bearing 1020 is overloaded and/or if there is not sufficient clearance, the machine 1000 can be shut down before damage occurs.

Because the flowrate from a feedhole can be modeled as proportional to the gap near the feedhole, and/or because the pressure drop in the exhaust orifice can be modeled as varying as the square of flowrate, the average pressure in the damping cavities can be related to the nominal clearance in the bearing. Using the nomenclature shown in FIG. 6 for pressures in the damping cavities, this can be modeled as $$(c/c_o) = [(\overline{P}_v - P_e)/(P_{v,o} - P_e)]^{1/2} \quad (30)$$

where the average pressure in the damping cavities is related to the measured pressures as $$\overline{P}_v = \frac{1}{4}(P_{v1} + P_{v2} + P_{v3} + P_{v4}) \quad (31)$$

As the shaft speed increases, the shaft can grow due to the stress induced by the centrifugal forces, and/or this effect can cause the mean clearance to shrink. Monitoring the average pressure in the damping cavities can be an effective way to monitor changes in clearance due to thermal and/or centrifugal effects.

The displacement of the shaft can similarly be monitored by measuring the difference in damping cavity pressures. Using the nomenclature shown in FIG. 6, the displacement along the x and y axes can be modeled using the following equations:

$$(x/c) = \frac{1}{2}(P_{v2} - P_{v1})/\overline{P}_v \quad (32)$$

$$(y/c) = \frac{1}{2}(P_{v4} - P_{v3})/\overline{P}_v \quad (33)$$

Compliant Mounting

Figure 7:
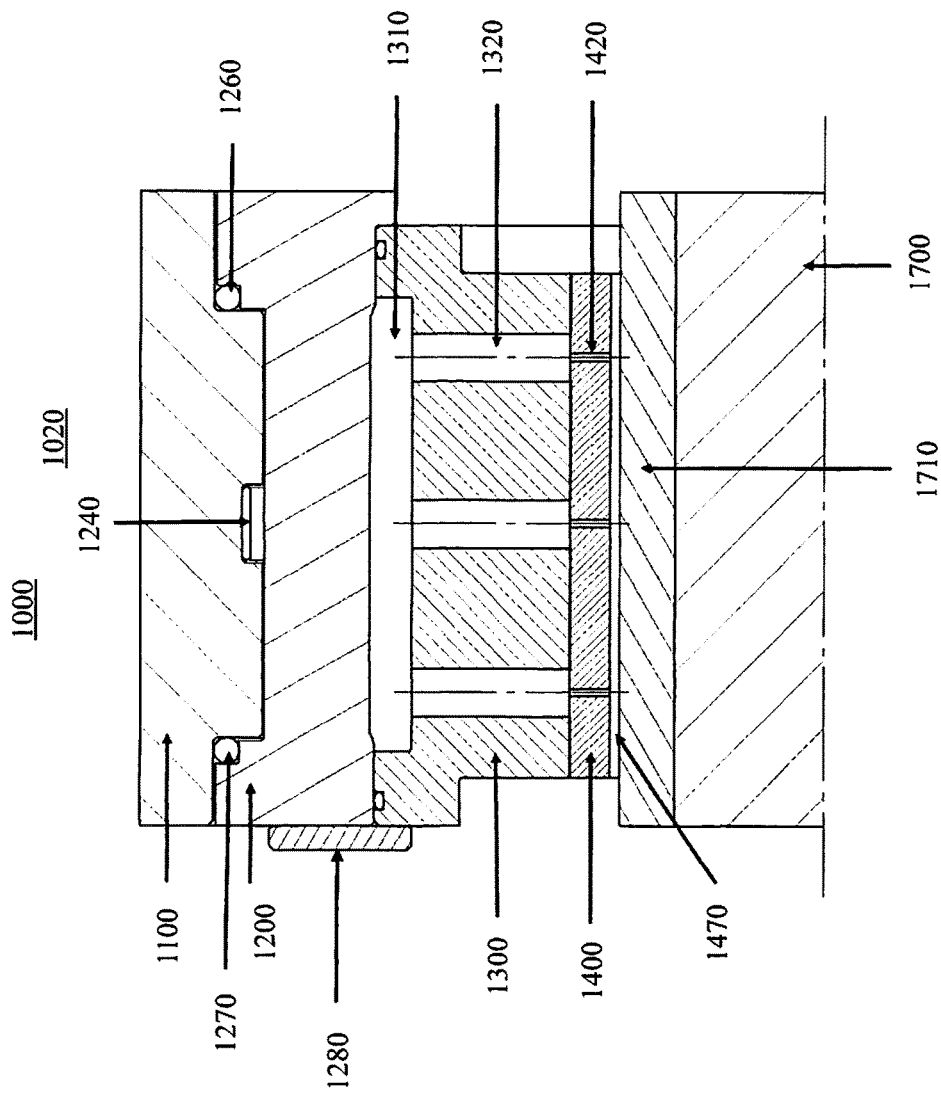
FIG. 7 is a radial cross-sectional view of an exemplary embodiment of a system.

FIG. 7 shows an exemplary embodiment that illustrates how the inner housing 1200 can be compliantly mounted in the outer housing 1100. Potential benefits for this compliant mounting can be:
Reduction in the required manufacturing precision; and/or
Increased damping and/or dynamic stability.

A radial bearing 1020 that incorporates multiple rows of feedholes 1420 that are substantially symmetric about the centerline of the radial bearing 1020 can allow the bearing 1020 to provide lateral and/or angular stiffness. Each row of feedholes 1420 can be thought of as an independent bearing, and therefore for a three-rowed bearing, the outer rows can provide angular stiffness and/or all three rows can contribute to the lateral stiffness on the shaft 1700.

FIG. 7 shows that the inner housing 1200 can be positioned in the outer housing 1100 by a wave spring 1240 in the center and/or by two elastomer O-rings 1260, 1270 located at either end of the radial bearing 1020. The wave spring 1240, which can be fabricated from a metal such as steel and/or a steel alloy, can provides stiffness and/or damping to lateral displacement of the inner housing 1200 relative to the outer housing 1100, but can provide little angular stiffness. The elastomer O-rings 1260, 1270, on the other hand, can provide damping for lateral and/or angular displacement of the inner housing 1200 relative to the outer housing 1100, but can offer little stiffness. Due to the large angular stiffness of the bearing 1020 combined with the potentially small angular stiffness provided by the compliant mounting of the inner housing 1200 in the outer housing 1100, the inner housing 1200 can substantially self-correct for misalignment of the outer surface of the outer housing 1100. This can reduce the required manufacturing precision of the alignment of the two radial bearings 1020 that are located at either end of a machine 1000, which can improve performance and/or reduce cost.

By incorporating a metallic wave spring 1240 substantially in the center of the bearing 1020, the compliant mounting need not use an elastomer to provide the positioning of the inner housing 1200 relative to the outer housing 1100. Elastomers can suffer from creep, which can cause a reduction in the centering capability of the O-ring 1260, 1270 if it were used in the center of the bearing 1020.

The metallic wave spring 1240 can provide damping for the bearing 1020. Lateral displacement of the inner housing 1200 relative to the outer housing 1100 can cause a deflection of the wave spring 1240, which in turn can cause Coulomb friction where the face of the wave spring 1240 contacts the OD of the inner housing 1200 and the ID of the outer housing 1100. This dissipation of energy through this rubbing can improve the dynamic stability of the bearing 1020.

The elastomer O-rings 1260, 1270 can improve the damping characteristics of the bearing 1020. Periodic angular and/or lateral displacement of the inner housing 1200 relative to the outer housing 1100 can cause compression and/or relaxation of two O-rings 1260, 1270. The hysteretic nature of the stress-strain curves for the materials of the O-rings 1260, 1270 can dissipate energy that can improve the dynamic stability of the bearing 1020.

Combined Journal and Thrust Bearing

Figure 8:
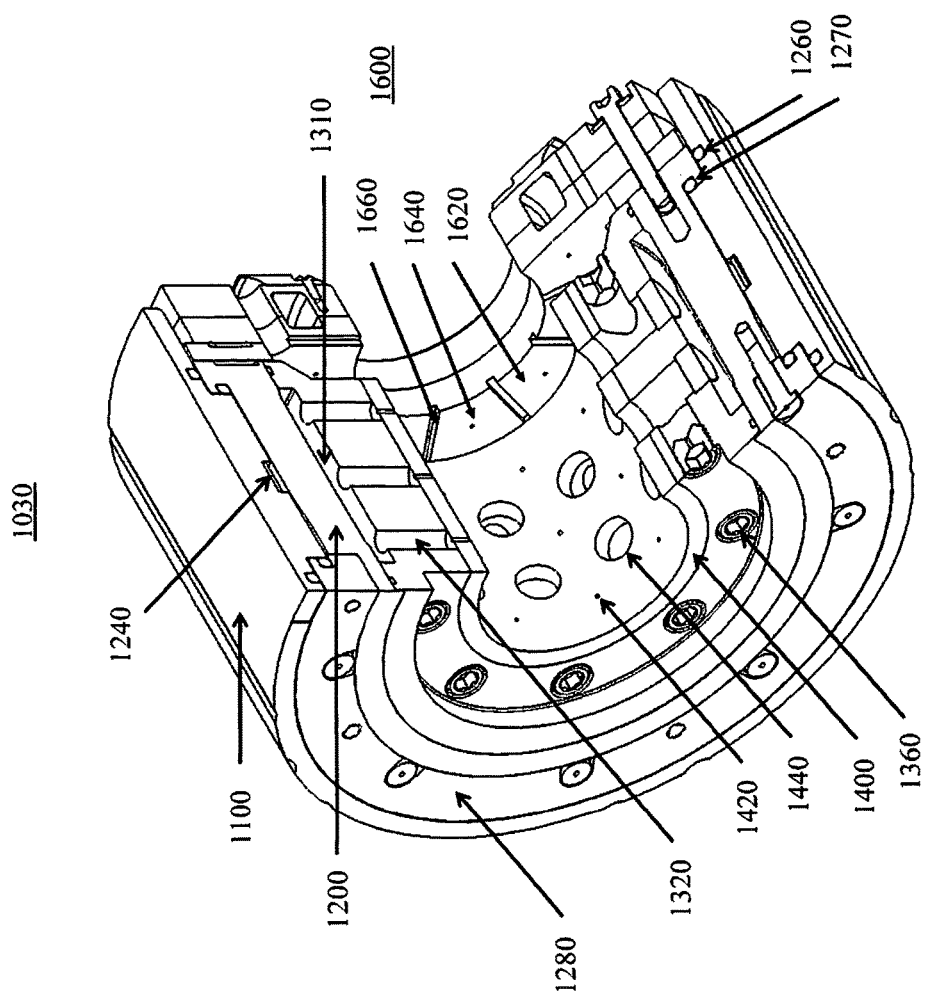
FIG. 8 is a perspective view of an exemplary embodiment of a system.

FIG. 8 shows a cut-away of an exemplary gas bearing 1020 that can provide lateral and/or axial positioning and/or support of a rotating shaft. The parts shown include an outer housing 1100, inner housing 1200, frame 1300, liner 1400, wave spring 1240, elastomer O-rings 1260, 1270, retainers 1280, and thrust plate 1620. Features in these parts potentially related to the flow of gas 1500 include the annular plenum 1310 in the frame 1300, supply holes 1320 in the frame, radial feedholes 1420 in the liner 1400, exhaust orifices 1360 in the frame 1300, and/or axial feedholes 1640 and/or radial slots 1660 in the thrust plate 1620. Note that the slots 1660 need not extend through the thrust plate 1620, or need not extend through the thrust plate 1620 along their entire length. Note further that the slots 1660 can function as channels having a predetermined depth and/or range of depths that vary along the channel. Note also that the slots 1660 need not be linear, but instead can provide a more circuitous route across the thrust plate 1620. Thus, the slots and/or channels 1660 can provide a route that is generally radial (which can include perfectly radial, nearly perfectly radial, substantially radial, and/or circuitously radial, etc. geometries).

Figure 9:
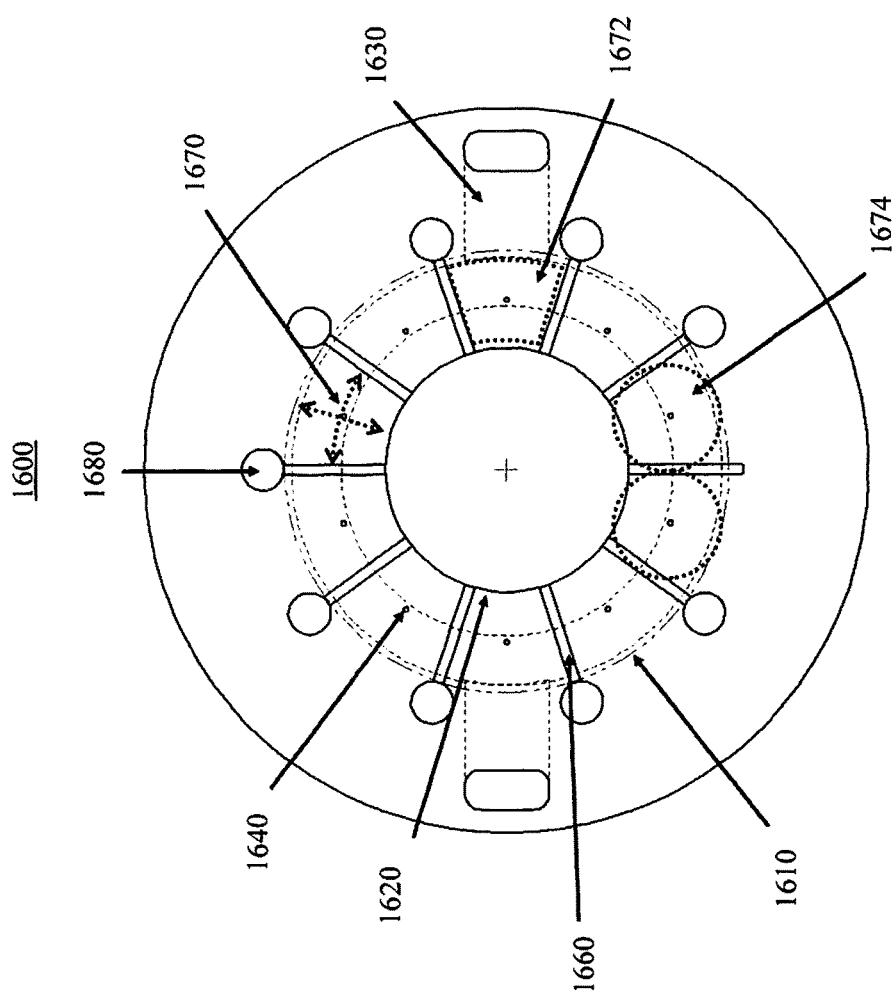
FIG. 9 is a longitudinal cross-sectional view of an exemplary embodiment of a system.

FIG. 9 shows an exemplary pattern of radial slots 1660 and axial feedholes 1640 in an exemplary embodiment of a thrust plate 1620. As shown by the flow path, the gas 1500 can exit the feedhole 1640 and/or expand in the axial clearance 1690 (see FIG. 10) between the thrust runner 1610 and the thrust plate 1620. Part of the gas 1500 exiting the feedhole 1640 can flow generally radially inwards towards the ID of the thrust plate 1620, part can flow generally radially outwards past the OD of the thrust runner 1610, and/or part can flow generally circumferentially towards the adjacent slots 1660. The boundaries of the slots 1660, ID of the thrust plate 1620, and/or OD of the thrust runner 1610 can form an imaginary "pad" 1672 surrounding each feedhole 1640, at or in which gas pressure can develop to support and/or position the thrust runner 1610 on the shaft. Also shown in FIG. 9 are the equivalent circular pads 1674 that are can be used to model the force produced by the pressure of the gas 1500 at or in each of the pads 1672. The force produced by the gas 1500 in the pads 1672 can act like the force produced by the pads in a radial bearing. For the portion of the gas 1500 that reaches the OD of the thrust runner 1610, the gas 1500 can exit the bearing compartment substantially axially through the exit holes 1680.

Figure 10:
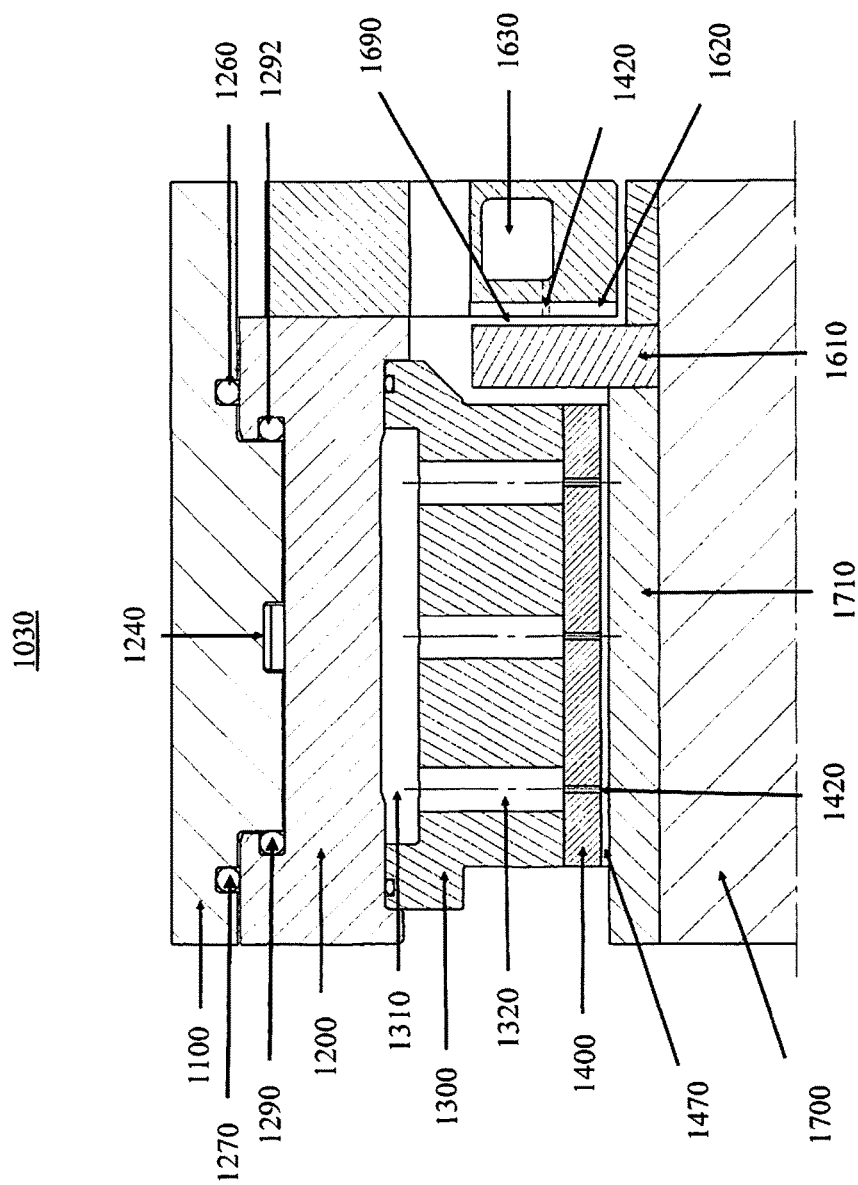
FIG. 10 is a radial cross-sectional view of an exemplary embodiment of a system.

FIG. 10 shows a cross-section of an exemplary embodiment of the combined radial and thrust bearing 1030. The axial force created in the axial clearance 1690 between the thrust plate 1620 and the thrust runner 1610 can push the thrust runner 1610 to the left to counter-act other forces on the shaft 1700 that can be pushing it to the right, maintaining a small axial clearance 1690 between the thrust runner 1610 and the thrust plate 1620. As in FIG. 7, a desired radial clearance 1470 can be maintained between liner 1400 and shaft 1700 and/or a journal 1710, which can be circumferentially surround shaft 1700.

Figure 11:
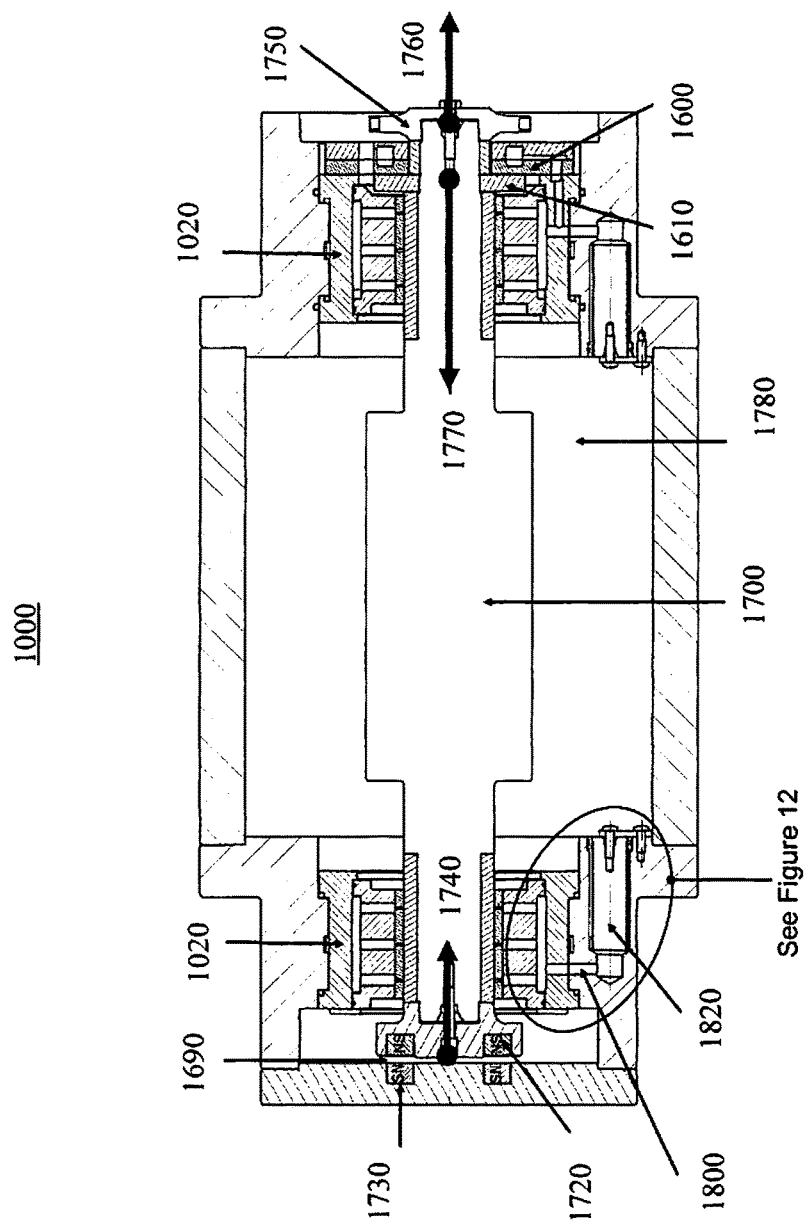
FIG. 11 is a radial cross-sectional view of an exemplary embodiment of a system.

FIG. 11 shows that the exemplary radial bearings 1020 and/or thrust bearing 1600 can be configured to support a rotating shaft 1700. A shaft ring permanent magnet 1720 can be mounted at one end of the shaft 1700 and/or can face a stationary ring permanent magnet 1730 of the same polarity so that there can be a repulsive force (or can be of the opposite polarity so that there can be an attractive force) between the magnets 1720, 1730. If configured for an attractive force, the ring mounted on the shaft can be a magnetic steel rather than a permanent magnet. If configured for a repulsive force, for example, the magnetic force can push the shaft 1700 to the right and/or towards the thrust bearing 1600 at the other end of the shaft 1700. Because the magnets 1720, 1730 can generate a large force even at a relatively large axial clearance 1690 (e.g., between approximately 0.05 and approximately 0.2 in) and/or because the magnetic stiffness produced by the ring magnets 1720, 1730 can be much smaller than the axial stiffness produced by the thrust bearing 1600, this configuration can allow the shaft 1700 to be accurately positioned in the thrust bearing 1600 even if the shaft length changes due to thermal growth. The thrust bearing 1600 can produce a force 1770 in the opposite direction as the magnetic force 1740. The thrust bearing 1600 can be sized so that it has sufficient load capacity to react to the magnetic force 1740 and/or other disturbance forces 1760 on the shaft, such as forces 1760 created by a shaft attachment 1750, such as a turbine disk, fan blades, motor winding and/or coil, pump impeller, and/or compressor impeller.

Condensate Removal

Features can be incorporated into certain exemplary embodiments of the gas bearings 1020, 1030, 1600 so that liquid condensing in the gas stream 1500 can be collected and/or removed from the bearings. This can permit operation of bearings 1020, 1030, 1600 that are supplied with a gas 1500 comprising saturated vapor such as refrigerant, steam, and/or other process gas. Condensate removal can reduce the requirements to dry the gas 1500 that is normally available, such as in an industrial, commercial, medical, or research facility.

For condensation of a component of the supply gas 1500 to occur, the temperature of that component must fall below the saturation temperature corresponding to the partial pressure of the gaseous component. Since the partial pressures of the components can be highest at the supply pressure, the saturation temperatures of the components also can be highest at this condition. This, combined with the observation that the expansion of the gas 1500 in the bearings is an isenthalpic process, can mean that condensation can be most likely to occur in the bearing where the gas is at the supply pressure. Therefore, features can be incorporated to collect and/or remove condensate in the supply plena.

FIG. 11 shows how a condensate drain system 1800 can be incorporated into an exemplary embodiment of the radial bearings 1020 and/or thrust bearings 1030, 1600. The condensate drain 1810, which can be located at the bottom of the annular plenum 1310, can deliver condensate to the condensate plug 1820, which can be accessible from a low pressure volume adjacent shaft 1700 and between bearings 1020. The condensate plug 1820 can be configured to offer a high resistance to the flow of gas 1500, but a much lower resistance to liquid. Therefore, any liquid that collects can be removed from the bearings on a continuous basis, but only a small amount of supply gas 1500 leaks from the bearing. For the case of a substantially pure supply gas 1500 such as refrigerant or steam, the condensate can flash to vapor as it leaves the condensate plug 1820, since the pressure at the exit can be lower than the vapor pressure. For impurities such as water in air supplied to a bearing, the liquid leaving the condensate plug 1820 can be collected and/or drained from the machine 1000.

To create a high flow resistance to the flow of supply gas 1500 through the condensate plug 1820, a flow channel 1840 with a high length-to-diameter (L/D) ratio (e.g., from approximately 1,000 to approximately 5,000) can be formed. The flow resistance can be configured with dimensions large enough so that it is unlikely to become blocked by debris in the gas stream 1500. Finally, the flow resistance can be compact so that it can be incorporated in the bearing.

Figure 12:
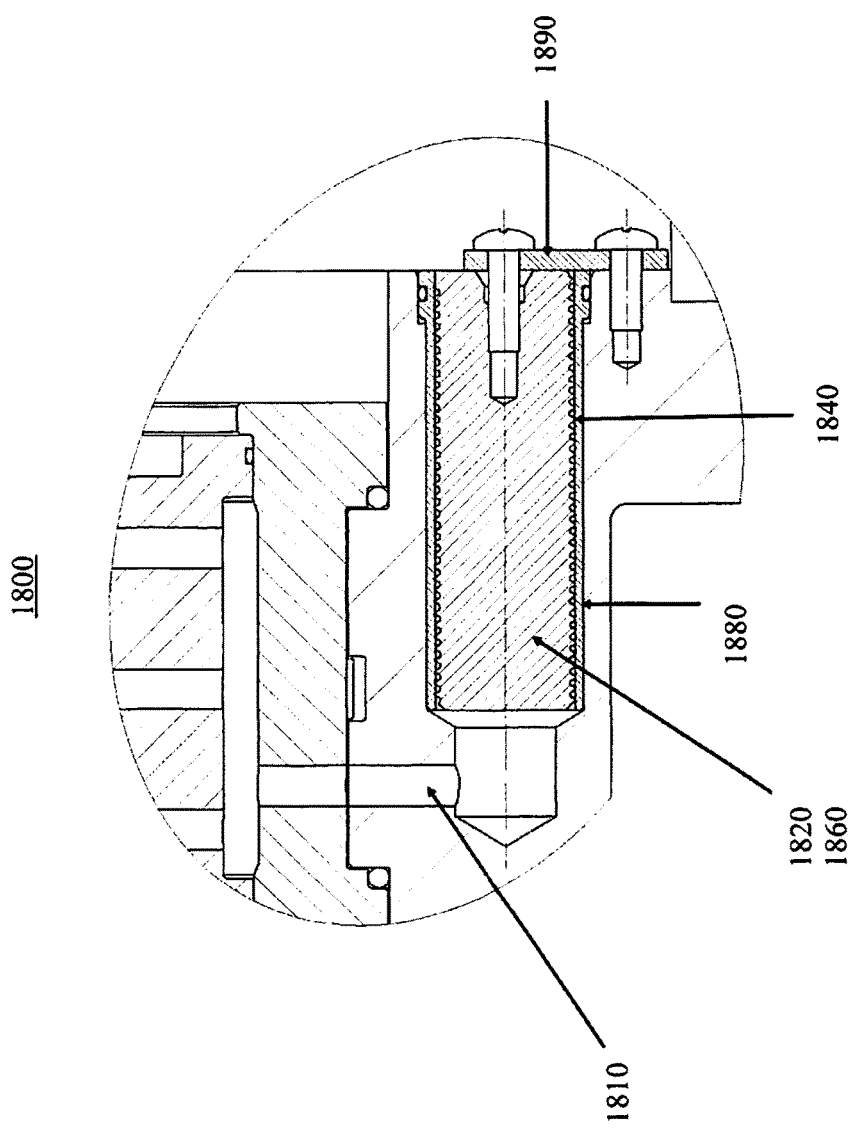
FIG. 12 is a detailed view of an exemplary embodiment of a system.

FIG. 12 shows the configuration of an exemplary condensate plug 1820 that can provide these capabilities. A threaded rod 1860 can be pressed into a sleeve 1880 and/or the flow channel 1840 can be formed by the threads of a rod 1860 and the ID of the sleeve 1880. A retention tab 1890 can be used to counteract the pressure force acting across the condensate plug 1820. For example, if a threaded rod 1860 is used with an OD of ⅞-in and with 18 threads per inch, then a rod length of approximately 2.7 in has a flow channel length of about 94 in (7.8 ft) and a flow area of approximately 0.0012 in². The equivalent diameter of the flow channel 1840 is approximately $D_e$=0.039 in, which means that the condensate plug 1820 can create a flow channel 1840 with an approximate $L/D_e$ of 2410.

Performance

An exemplary embodiment of a machine 1000 with the configuration shown in FIG. 11 was fabricated with two radial bearings 1020, a thrust bearing 1600, and ring magnets 1720, 1730 to load the thrust bearing 1600. The OD of the bearing's journals 1710 were 2.2 in and the OD of the thrust runner 1610 was 3.4 in. The weight of the shaft 1700 was 56 lb.

Figure 13:
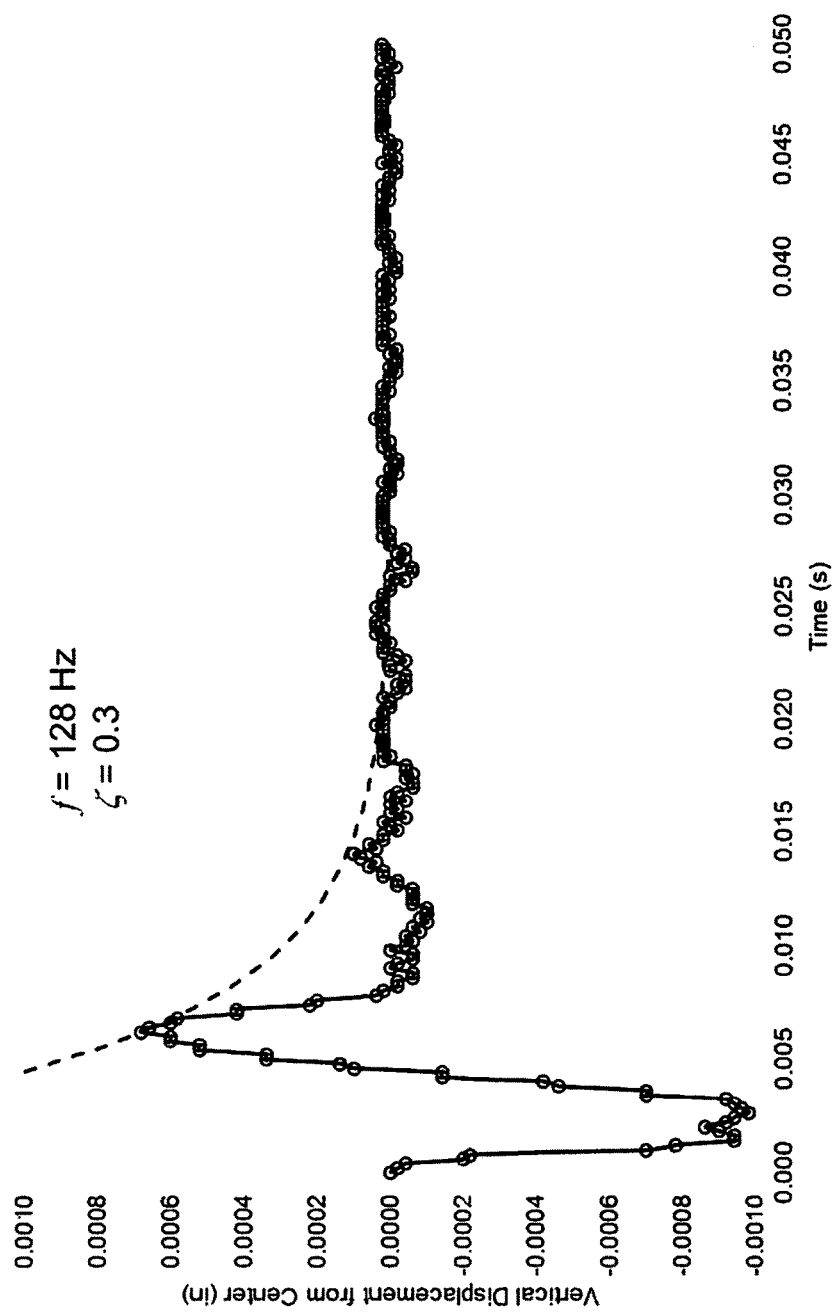
FIG. 13 is a graph of vertical displacement vs. time for an exemplary embodiment of a system.

FIG. 13 shows, for the exemplary embodiment shown in FIG. 12, the radial displacement of the shaft relative to the center of the bearing liner when a co-linear impulse force was applied to the center of the shaft. The predominant mode of the shaft has a frequency of $f$=128 Hz ($\omega$=804 rad/s) and decays with a damping ratio of $\zeta$=0.3, equivalent to an amplification factor AF=1.7. This means that a phase lead of 31° is produced by damping cavities and compliant mounting, and the resonance at this frequency is well-damped.

Figure 14:
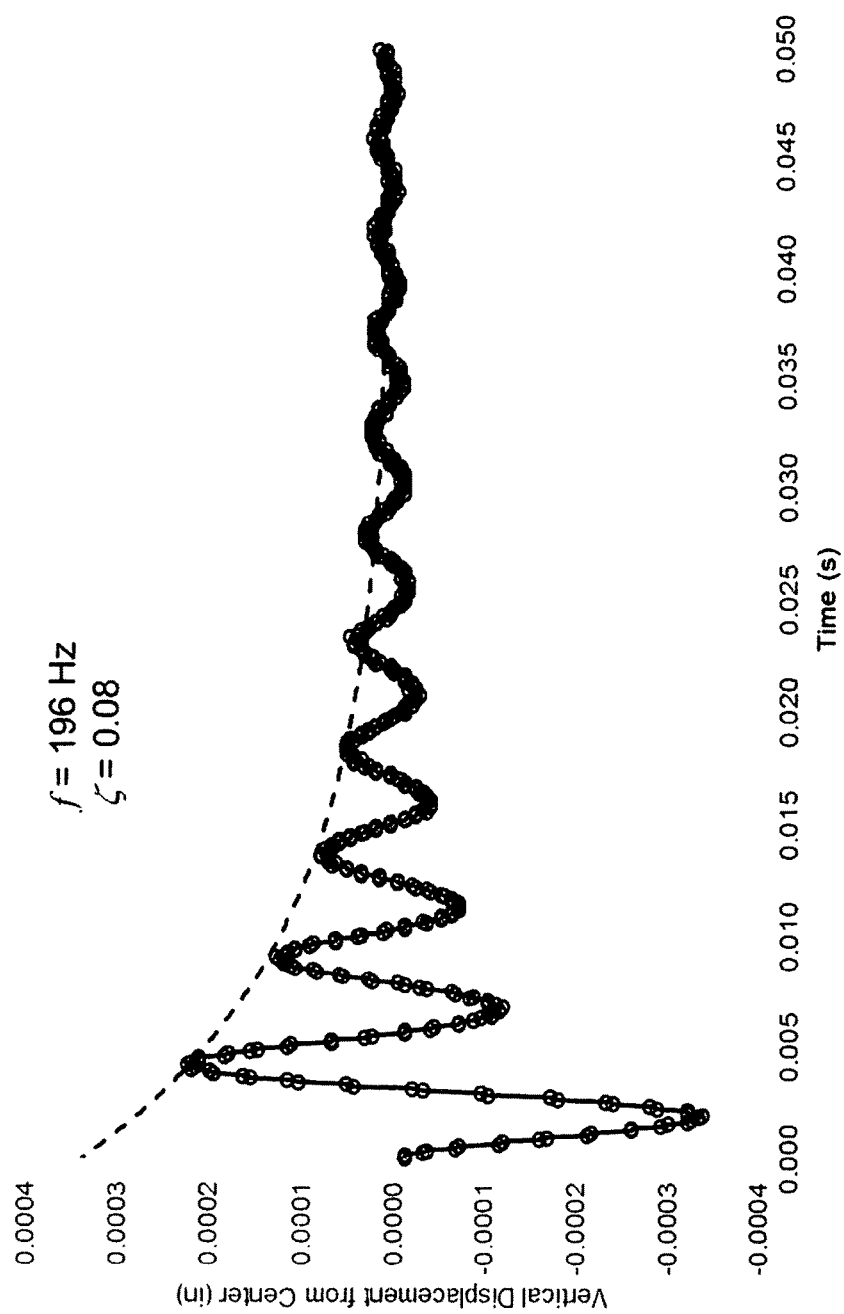
FIG. 14 is a graph of vertical displacement vs. time for an exemplary embodiment of a system.

FIG. 14 again shows, for the exemplary embodiment shown in FIG. 12, the radial displacement of the shaft relative to the center of the bearing liner when a co-linear impulse force was applied to the center of the shaft. However, before applying the impulse, the exhaust orifices were removed from the damping cavities so that the pressure in the cavities was the same as the exit pressure in the bearing. Without the negative stiffness of the damping cavities lowering the net stiffness, the frequency of the predominant mode increased from $f$=128 Hz to $f$=196 H ($\omega$=1232 rad/s). However, the damping ratio decreased from $\zeta$=0.3 to $\zeta$=0.08, equivalent to an amplification factor of AF=6.3. By comparing the change in damping ratio for the two configurations, the improvement in stability offered by the damping cavities is evident.

With the exhaust orifices installed, gas pressure was applied to the nozzles of the turbine rotor and the shaft was accelerated until a maximum speed of 16,000 rpm was attained. The observed amplification as the rigid body critical speeds were crossed never exceeded 1.7. The orbit radius at 16,000 rpm was 60 μin along they (vertical) axis and 20 μin along the x (horizontal) axis, and the system was very stable as indicated by the low amplification factors at the critical speeds and the absence of frequency content in the shaft displacements other than the fundamental frequency at the rotational speed.

Certain exemplary embodiments can provide an amplification factor at critical speeds of between 1.0 and 4.0, including all values and subranges there between, such as 1.1, 1.221, 1.43, 1.5001, 1.64, 1.9, 2, 2.44, 2.75, and/or 3.01, etc., and/or between 1.25 and 2.47, 1.5 and 3, and/or 1.66 and 3.14, etc. An amplification factor in such a range can provide the machine with a "well-damped" critical speed and/or can eliminate the need to provide "separation" between the machine's critical speed and its running speed.

Compliant-Mounting of Backup Bearing to Magnetic Bearing

Some of the advantages of compliantly mounting an externally pressurized gas bearing also can be advantages when other bearing types are compliantly mounted. A bearing such as a ball bearing can offer high inherent stiffness but low damping. The dynamic stability at high rotational speeds can be enhanced by reducing the effective stiffness and/or increasing the effective damping of the bearing.

Figure 15:
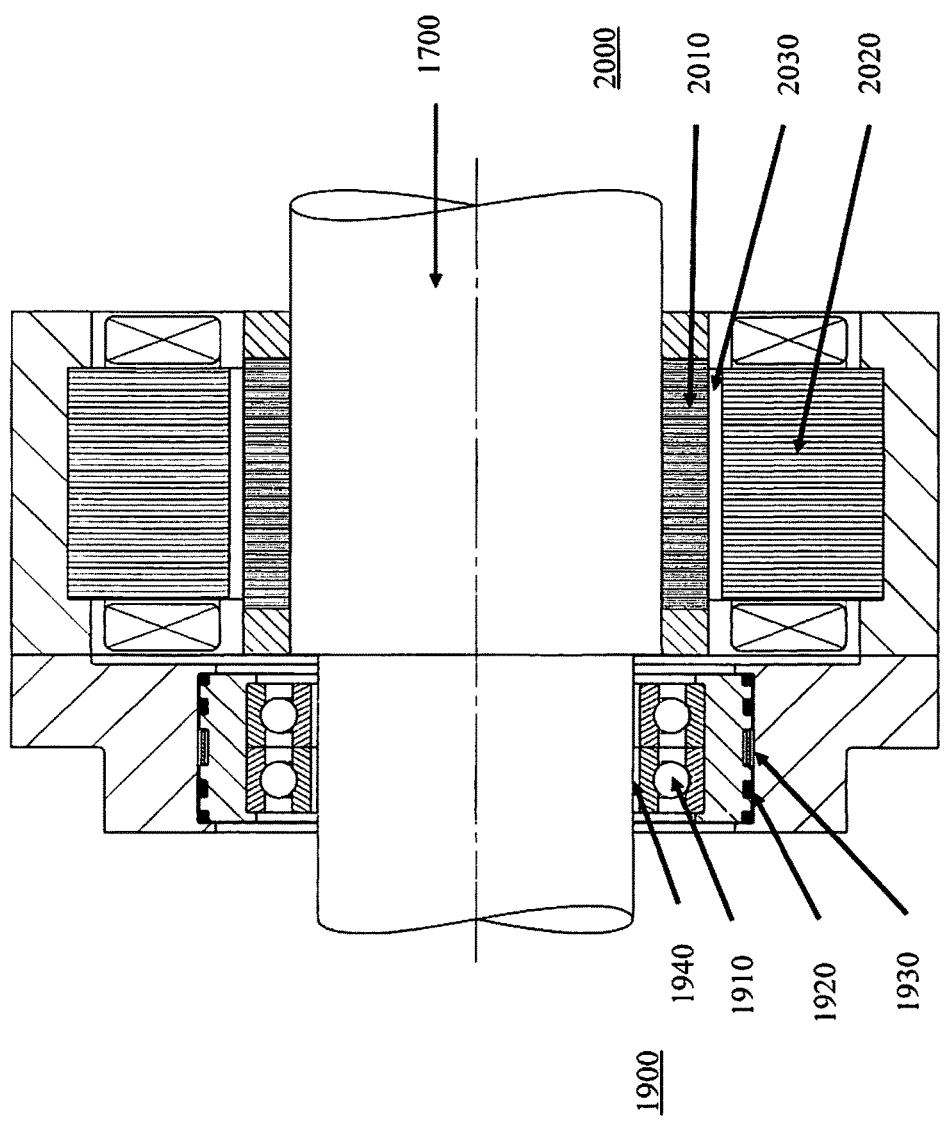
FIG. 15 is a radial cross-sectional view of an exemplary embodiment of a system.

FIG. 15 shows an example of how a ball bearing system 1900, which can serve as a backup to a magnetic bearing system 2000, can be compliantly mounted. When the magnetic bearing 2000 is operating in a normal condition, the air gap 2030 in the magnetic bearing 2000 and the air gap 1940 in the backup ball bearing system 1900 can be maintained and there need be no contact between the rotating and stationary components. However, if the magnetic bearing 2000 were to fail, the shaft 1700 could contact the backup ball bearing 1910 before the rotor 2010 and stator 2020 of the magnetic bearing 2000 contact because the ball bearing air gap 1940 can be smaller than the magnet bearing air gap 2030. The dynamic stability of the rotating shaft 1700 when supported on the backup ball bearing 1910 can be enhanced by the compliant mounting, which can consist of an arrangement of wave springs 1930 and O-rings 1920. The compliant mounting can reduce the frequency and amplitude of whirling of the shaft 1700 in the backup ball bearing 1910. Without compliant mounting of the backup bearing 1910, the forces that can develop from whirling of the shaft 1700 might severely damage the backup bearing 1910.

Certain exemplary embodiments can provide any of:

An externally-pressured gas bearing system configured to provide at least lateral positioning of a rotating shaft of a machine using an externally-pressurized gas, the system comprising:

the rotating shaft;

a bearing comprising:
- an outer housing that defines an outer housing gas inlet port that is configured to receive the gas from a gas supply;
- an inner housing that defines an inner housing gas inlet port that is configured to receive the gas from the outer housing gas inlet port;
- a frame that defines:
  - an annular plenum located between the inner housing and the frame, the plenum configured to receive the gas from the inner housing gas inlet port and to circumferentially distribute the gas around the frame;
  - a plurality of gas supply frame holes configured to receive the gas from the plenum;
  - a plurality of frame gas exhaust orifices configured to route the gas away from the bearing; and/or
  - a plurality of damping cavities configured to:
    - receive the gas from the plurality of damping apertures;
    - provide the gas to the plurality of frame gas exhaust orifices; and
    - damp vibration of the shaft;
- a liner that defines:
  - a plurality of feedholes configured to receive the gas from the plurality of gas supply frame holes, circumferentially distribute the gas within a clearance defined between the liner and the shaft;
  - a plurality of liner damping apertures configured to receive the gas from the clearance and provide the gas to the plurality of damping cavities; and/or
  - a plurality of liner gas exhaust orifices configured to route the gas away from the plurality of damping cavities;
- a wave spring configured to:
  - position the inner housing within the outer housing; and/or
  - provide damping for lateral displacement of the shaft;
- a least one O-ring configured to provide damping for:
  - lateral displacement of the inner housing relative to the outer housing; and/or
  - angular displacement of the inner housing relative to the outer housing;
- a plurality of pressure sensors configured to measure pressures in the plurality of damping cavities.
- a thrust plate that defines:
  - a plurality of axial feedholes configured to route the gas to the axial clearance;
  - a plurality of generally radial channels configured to route the gas to the plurality of damping apertures, the plurality of damping cavities, and/or the plurality of liner gas exhaust orifices;
  - an axial clearance between the thrust plate and a thrust runner coupled to the rotating shaft, the axial clearance configured to receive the gas;
  - wherein, when the shaft is oriented substantially horizontally, operation of the rotating machine creates a thrust force;
  - wherein, when the shaft is oriented substantially vertically, operation of the rotating machine and the shaft weight combine to create the thrust force;
  - wherein the axial clearance is configured to generate a counteracting force from the gas that is in the axial clearance, the counteracting force sufficient to:
    - counter-act the thrust force;
    - maintain the axial clearance above a minimum axial dimension;
    - influence an axial position of the shaft within the bearing system;
    - be greater than or equal to a magnetic axial force generated between a rotating ring permanent magnet having a first polarity, the rotating ring permanent magnet configured to magnetically couple with a stationary ring permanent magnet having an opposite second polarity;
- the thrust runner;
- a condensate drain configured to be fluidically coupled to the annular plenum;
- a condensate plug configured to:
  - receive condensate from a condensate drain, the condensate drain configured to be fluidically coupled to the annular plenum;
  - provide a first resistance to flow of the gas and a second resistance to flow of the condensate, the first resistance higher than the second resistance;
  - define a flow channel having a length-to-equivalent diameter ($L/D_e$) ratio of from approximately 1,000 to approximately 5,000;
  - offer a first resistance to flow of the gas and a second resistance to flow of the condensate, the first resistance higher than the second resistance; and/or
  - define a flow channel having a length-to-equivalent diameter ($L/D_e$) ratio of from approximately 1,000 to approximately 5,000; and/or
  - the condensate plug comprising a rod threaded into a sleeve, a gap between threads of the rod and threads of the sleeve defining the flow channel; and/or
- a rotating ring permanent magnet having a first polarity and configured to magnetically interface with a stationary ring permanent magnet having an opposite second polarity to produce a repulsive axial force or an attractive axial force;
- wherein:
  - the inner housing is compliantly mounted in the outer housing; and/or the system provides an amplification factor at critical speeds of between 1.0 and 4.0.

Certain exemplary embodiments can provide a ball bearing system configured to provide backup to a magnetic bearing system, the system comprising:

a bearing housing;

a ball bearing configured to compliantly mount in the bearing housing, to surround a longitudinal portion of a rotating shaft, but not to contact the rotating shaft during normal operation of a machine that comprises the shaft;

a wave spring configured to compliantly position the ball bearing in the bearing housing; and/or a least one O-ring configured to compliantly position the ball bearing in the bearing housing;

the ball bearing system configured to, responsive to failure of a magnetic bearing system supporting the rotating shaft, contact, support, and/or reduce a frequency and an amplitude of whirling of the rotating shaft.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

- a—at least one.
- about—around and/or approximately.
- above—at a higher level.
- across—from one side to another.
- activity—an action, act, step, and/or process or portion thereof.
- adapt—to design, make, set up, arrange, shape, configure, and/or make suitable and/or fit for a specific purpose, function, use, and/or situation.
- adapter—a device used to effect operative compatibility between different parts of one or more pieces of an apparatus or system.
- after—following in time and/or subsequent to.
- along—through, on, beside, over, in line with, and/or parallel to the length and/or direction of; and/or from one end to the other of
- amplification factor—(a.k.a. Q factor or Q) a dimensionless parameter that compares the exponential time constant τ for decay of an oscillating physical system's amplitude to its oscillation period and/or compares the frequency at which a system oscillates to the rate at which it dissipates its energy, that thereby describes how under-damped an oscillator or resonator is and/or characterizes a resonator's bandwidth relative to its center frequency, such that higher Q indicates a lower rate of energy loss relative to the stored energy of the resonator and oscillations die out more slowly (e.g., a pendulum suspended from a high-quality bearing, oscillating in air, has a high Q, while a pendulum immersed in oil has a low Q).
- an—at least one.
- and—in conjunction with.
- and/or—either in conjunction with or in alternative to.
- angular—measured by an angle or by degrees of an arc.
- annular—shaped like a ring.
- any—one, some, every, and/or all without specification.
- aperture—an opening, hole, gap, passage, and/or slit.
- apparatus—an appliance or device for a particular purpose.
- approximately—about and/or nearly the same as.
- around—about, surrounding, and/or on substantially all sides of; and/or approximately.
- as long as—if and/or since.
- associate—to join, connect together, and/or relate.
- at—in, on, and/or near.
- at least—not less than, and possibly more than.
- away—on a path directed from a predetermined location.
- axial—located on, around, or in the direction of an axis.
- bearing—a device that supports, guides, and/or reduces the friction of motion between fixed and moving machine parts.
- between—in a separating interval and/or intermediate to.
- by—via and/or with the use and/or help of
- can—is capable of, in at least some embodiments.
- cause—to bring about, provoke, precipitate, produce, elicit, be the reason for, result in, and/or effect.
- cavity—a hollow area within an object.
- channel—a defined passage, conduit, and/or groove for conveying one or more fluids.
- circuit—an electrically conductive pathway and/or a communications connection established across two or more switching devices comprised by a network and between corresponding end systems connected to, but not comprised by the network.
- circumferentially—of, at, or near the circumference; surrounding; lying along the outskirts
- clearance—a volume, passage, space between two parts in motion or in relative motion and/or amount of space and/or distance by which a moving object clears something.
- compliantly—in a complying, obeying, obliging, and/or yielding manner.
- composition of matter—a combination, reaction product, compound, mixture, formulation, material, and/or composite formed by a human and/or automation from two or more substances and/or elements.
- comprising—including but not limited to.
- condensate—material derived by a change in physical state from a vapor to a liquid.
- configure—to design, arrange, set up, shape, and/or make suitable and/or fit for a specific purpose, function, use, and/or situation.
- connect—to join or fasten together.
- containing—including but not limited to.
- convert—to transform, adapt, and/or change.
- corresponding—related, associated, accompanying, similar in purpose and/or position, conforming in every respect, and/or equivalent and/or agreeing in amount, quantity, magnitude, quality, and/or degree.
- counteract—to oppose, neutralize, or mitigate the effects of by contrary action
- couple—to join, connect, and/or link two things together by any known means, including mechanical, fluidic, acoustic, electrical, magnetic, and/or optical, etc.
- coupleable—capable of being joined, connected, and/or linked together.
- coupling—linking in some fashion.
- create—to bring into being.
- create—to make, form, produce, generate, bring into being, and/or cause to exist.
- critical speed—the rotational speed that excites the natural frequency of a rotating object (e.g., a shaft, propeller, screw, and/or gear), such that as the speed of rotation approaches the object's natural frequency, the object begins to resonate, which dramatically increases system vibration.
- damp—to decrease the amplitude of vibrations.
- damping—an effect, either deliberately engendered and/or inherent to a system, that tends to reduce the amplitude of oscillations by creating a force that is proportional to the velocity and in the opposite direction.
- define—to establish the meaning, relationship, outline, form, and/or structure of;
- and/or to precisely and/or distinctly describe and/or specify.
- derive—to receive, obtain, and/or produce from a source and/or origin.
- determine—to find out, obtain, calculate, decide, deduce, ascertain, and/or come to a decision, typically by investigation, reasoning, and/or calculation.

device—a machine, manufacture, and/or collection thereof.

diameter—a length of a straight line segment passing through a center of an object and terminating at the periphery thereof.

dimension—an extension in a given direction and/or a measurement in length, width, or thickness.

displacement—a vector or the magnitude of a vector from the initial position to a subsequent position assumed by a body.

distribute—to deliver, pass out, and/or spread.

drain—a pipe, channel, and/or aperture by which liquid is drawn off each—every one of a group considered individually.

effective—sufficient to bring about, provoke, elicit, and/or cause.

embodiment—an implementation, manifestation, and/or concrete representation.

equal—substantially the same as.

equivalent diameter—for a given closed two-dimensional shape (such as the cross section of a channel), the diameter of a circle that offers the same hydraulic resistance as the shape. For turbulent flow, it is approximately four times the flow area divided by the wetted perimeter.

estimate—(n) a calculated value approximating an actual value; (v) to calculate and/or determine approximately and/or tentatively.

exemplary—serving as an example, instance, and/or illustration.

exhaust—an exit and/or opening defined by an object, the opening adapted to conduct a flow of gas.

external—exterior and/or relating to, existing on, and/or connected with the outside and/or or an outer part.

externally-pressurized gas—any portion of a stream or flow of pressurized gas supplied to a bearing from a source external to the bearing.

feedhole—a small opening through which something passes and is introduced into another volume, such as when a gas passes through a feedhole and is introduced into an air gap.

first—a label for a referenced element in one or more patent claims, but that label does not necessarily imply any type of ordering to how that element (or any other elements of a similar type) is implemented in embodiments of the claimed subject matter.

flow—(n) a stream and/or current; (v) to move and/or run smoothly with unbroken continuity, as in the manner characteristic of a fluid.

fluidically—via a fluid.

for—with a purpose of force—a capacity to do work or cause physical change.

frame—a structure adapted to support and/or contain something.

from—used to indicate a source, origin, and/or location thereof.

further—in addition.

gap—a space between objects.

gas—a state of matter distinguished from the solid and liquid states by relatively low density and viscosity, relatively great expansion and contraction with changes in pressure and temperature, the ability to diffuse readily, and/or the spontaneous tendency to become distributed uniformly throughout any container; and/or a substance in a gaseous state.

generally—perfectly, precisely, imperfectly, substantially, essentially, basically, fundamentally, mainly, on average, and/or on the whole.

generate—to create, produce, give rise to, and/or bring into existence; and/or to produce electrical power.

given— greater—larger and/or more than.

having—possessing, characterized by, comprising, and/or including, but not limited to.

higher—greater than.

hole—a hollowed place in an object.

housing—something that covers, encloses, protects, holds, and/or supports, such as a frame, box, and/or chassis.

including—including but not limited to.

influence—to have an effect upon.

initialize—to prepare something for use and/or some future event.

inlet—an opening providing a means of entrance or intake.

inner—closer than another to the center and/or middle.

install—to connect or set in position and prepare for use.

into—toward, in the direction of, and/or to the inside of.

is—to exist in actuality.

lateral—along the side of.

liner—a lining and/or sleeve, usually of a material that will withstand wear and/or corrosion, and typically fixed inside or outside a structural component.

located—situated approximately in a particular spot, region, and/or position.

machine—a device and/or assembly adapted to perform at least one task.

magnet—an object that is surrounded by a magnetic field and that has the property, either natural or induced, of attracting iron or steel; a body that can attract certain substances, such as iron or steel, as a result of a magnetic field; and/or a piece of ferromagnetic substance.

magnetic—having the property of be attracted to a magnet.

maintain—to retain, preserve, sustain, keep in an existing state, and/or continue to obtain.

may—is allowed and/or permitted to, in at least some embodiments.

measure—(n) a quantity ascertained by comparison with a standard and/or manual and/or automatic observation. (v) to physically sense, and/or determine a value and/or quantity of something relative to a standard.

method—one or more acts that are performed upon subject matter to be transformed to a different state or thing and/or are tied to a particular apparatus, said one or more acts not a fundamental principal and not pre-empting all uses of a fundamental principal.

minimum—a smallest or lowest level.

mount—(n) that upon which a thing is attached. (v) to couple, fix, and/or attach on and/or to something.

near—a distance of less than approximately [X].

no—an absence of and/or lacking any.

O-ring—a ring made of a pliable material, such as rubber or plastic, and used as a gasket and/or seal.

one—being and/or amounting to a single unit, individual, and/or entire thing, item, and/or object.

operable—practicable and/or fit, ready, and/or configured to be put into its intended use and/or service.

opposite—placed and/or located directly across from something else or from each other; facing away from; facing toward; being the other of two complementary or mutually exclusive things; and/or diametrically different in character, tendency, belief, etc.

or—a conjunction used to indicate alternatives, typically appearing only before the last item in a group of alternative items.

orifice—an opening, especially to a cavity or passage of the body; a mouth and/or vent.

outer—farther than another from the center and/or middle.

outside—beyond a range, boundary, and/or limit; and/or not within.

per—for each and/or by means of.

permanent—lasting or remaining without essential change.

plate—(n) a substantially planar body having a thickness measured perpendicular to the plane that is relatively small in comparison to the width and length of the body; (v) to coat with a thin layer of metal.

plenum—a condition, space, and/or enclosure in which air and/or other gas is at a pressure greater than that of the outside atmosphere.

plug—an object used to substantially fill a hole.

plurality—the state of being plural and/or more than one.

polarity—the condition of a body and/or system in which it has opposing physical properties at different points, especially magnetic poles or electric charge; an electrical potential relative to a reference electrical potential that determines a direction of electron flow, from negative to positive, in a direct current circuit; and/or the condition of having poles or being aligned with or directed toward poles, especially magnetic or electric poles.

port—an opening and/or defined aperture configured for the insertion and/or passage of a part and/or fluid.

portion—a part, component, section, percentage, ratio, and/or quantity that is less than a larger whole.

position—(n) a place and/or location, often relative to a reference point. (v) to place and/or locate.

pre-—a prefix that precedes an activity that has occurred beforehand and/or in advance.

predetermine—to determine, decide, and/or establish in advance.

pressure—a measure of force applied uniformly over a surface.

pressured—subject to pressure.

prevent—to hinder, avert, and/or keep from occurring.

prior—before and/or preceding in time or order.

probability—a quantitative representation of a likelihood of an occurrence.

product—something produced by human and/or mechanical effort.

project—to calculate, estimate, or predict.

provide—to furnish, supply, give, convey, send, and/or make available.

radial—radiating and/or extending from and/or converging to a common center, center of rotation, and/or perpendicular axis of rotation.

range—a measure of an extent of a set of values and/or an amount and/or extent of variation.

ratio—a relationship between two quantities expressed as a quotient of one divided by the other.

receive—to gather, take, acquire, obtain, accept, get, and/or have bestowed upon.

recommend—to suggest, praise, commend, and/or endorse.

reduce—to make and/or become lesser and/or smaller.

relative—considered with reference to and/or in comparison to something else.

remove—to eliminate, remove, and/or delete, and/or to move from a place or position occupied.

repeat—to do again and/or perform again.

repeatedly—again and again; repetitively.

request—to express a desire for and/or ask for.

resistance—the act and/or an instance of resisting the flow of a fluid or electrical current; the capacity to resist; a force that tends to oppose and/or retard motion; and/or a measure of a voltage drop across a resistor, typically having units of Ohms.

result—(n.) an outcome and/or consequence of a particular action, operation, and/or course; (v.) to cause an outcome and/or consequence of a particular action, operation, and/or course.

ring—a substantially toroidal object that can be imagined as having been generated by rotating a closed loop (e.g., ellipse, circle, irregular curve, polygon, etc.) about a fixed line external to the loop.

rod—an elongated structure having a cross-section taken perpendicular to its longitudinal axis that is substantially elliptical and/or circular shaped.

rotating—turning about an axis.

rotation—an act and/or process of turning around a center and/or an axis.

route—(v) to send, direct, and/or forward by a particular route and/or path.

said—when used in a system or device claim, an article indicating a subsequent claim term that has been previously introduced.

second—a label for an element in one or more patent claims, the element other than a "first" referenced element of a similar type, but the label does not necessarily imply any type of ordering to how that "second" element or the "first" element is implemented in embodiments of the claimed subject matter.

select—to make a choice or selection from alternatives.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electro-magnetic radiation, etc.) and convert that physical quantity into a signal. Examples include proximity switches, stain gages, photo sensors, thermocouples, level indicating devices, speed sensors, accelerometers, electrical voltage indicators, electrical current indicators, on/off indicators, and/or flowmeters, etc.

set—a related plurality.

shaft—a long, generally cylindrical bar that is adapted to rotate about a longitudinal axis and to transmit power.

sleeve—an annular member and/or part.

species—a class of individuals and/or objects grouped by virtue of their common attributes and assigned a common name; a division subordinate to a genus.

speed—a linear, curvilinear, and/or angular velocity and/or a linear, curvilinear, and/or angular distance traveled during a predetermined time interval.

spring—a flexible elastic object, such as a coil of wire, bent bar, coupled set of plates, washer, etc., that regains its original shape after being compressed or extended, is used to store mechanical energy, and is often made of hardened and tempered material, such as steel. Types of springs can include coil springs, helical springs, conical springs, torsion springs, tension springs, compression springs, leaf springs, V-springs, spiral springs, spring washers, gas springs, rubber bands, etc.

stationary—substantially fixed with respect to an object of reference.

store—to place, hold, and/or retain data, typically in a memory.

substantially—to a great extent and/or degree.

sufficient—a degree and/or amount necessary to achieve a predetermined result.

supply—to make available for use.

support—to bear the weight of, especially from below.

system—a collection of mechanisms, devices, machines, articles of manufacture, processes, data, and/or instructions, the collection designed to perform one or more specific functions.

that—a pronoun used to indicate a thing as indicated, mentioned before, present, and/or well known; and/or the subject or object of a relative clause.

the gas—any portion of a stream or flow of pressurized gas supplied to a bearing from a source external to the bearing.

thread—a helical and/or spiral ridge used for advancing a shaft in a longitudinal direction, such as found on screws, nuts, and bolts.

threaded—comprising a helical and/or spiral ridge used for advancing a shaft in a longitudinal direction, such as found on screws, nuts, and bolts.

through—across, among, between, and/or in one side and out the opposite and/or another side of.

thrust—relating to a bearing adapted to restrain displacement substantially parallel to an axis of rotation.

thrust runner—a substantially annular plate that is coaxially attached to a shaft.

to—a preposition adapted for use for expressing purpose.

transform—to change in measurable: form, appearance, nature, and/or character.

transmit—to send as a signal, provide, furnish, and/or supply.

treatment—an act, manner, or method of handling and/or dealing with someone and/or something.

upon—immediately or very soon after; and/or on the occasion of.

use—to put into service, utilize, make work, and/or employ for a particular purpose and/or for its inherent and/or natural purpose.

via—by way of and/or utilizing.

vibrate—to oscillate and/or move back and forth or to and fro, especially rhythmically and/or rapidly.

wave—an undulating shape or form.

wave spring—a flat wire compression spring.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

NOTE

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:
any two or more described substances can be mixed, combined, reacted, separated, and/or segregated;
any described characteristic, function, activity, substance, component, and/or structural element, or any combination thereof, can be specifically included, duplicated, excluded, combined, reordered, reconfigured, integrated, and/or segregated;
any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. An externally-pressured gas bearing system configured to provide at least lateral positioning of a rotating shaft of a machine using an externally-pressurized gas, the system comprising:
    a bearing comprising:
        an outer housing that defines an outer housing gas inlet port that is configured to receive the gas from a gas supply;
        an inner housing that defines an inner housing gas inlet port that is configured to receive the gas from the outer housing gas inlet port;
        a frame that defines:
            an annular plenum located between the inner housing and the frame, the plenum configured to receive the gas from the inner housing gas inlet port and to circumferentially distribute the gas around the frame;
            a plurality of gas supply frame holes configured to receive the gas from the plenum;
            a plurality of frame gas exhaust orifices configured to route the gas away from the bearing; and
            a plurality of damping cavities configured to:
                receive the gas from the plurality of liner damping apertures;
                provide the gas to the plurality of frame gas exhaust orifices; and
                damp vibration of the shaft; and
        a liner that defines:
            a plurality of feedholes configured to receive the gas from the plurality of gas supply frame holes, circumferentially distribute the gas within a clearance defined between the liner and the shaft;
            a plurality of liner damping apertures configured to receive the gas from the clearance and provide the gas to the plurality of damping cavities; and
            a plurality of liner gas exhaust orifices configured to route the gas away from the plurality of damping cavities.

2. The system of claim 1, wherein:
the inner housing is compliantly mounted in the outer housing.

3. The system of claim 1, further comprising:
a wave spring configured to position the inner housing within the outer housing.

4. The system of claim 1, further comprising:
a wave spring configured to provide damping for lateral displacement of the shaft.

5. The system of claim 1, further comprising:
a least one O-ring configured to provide damping for lateral displacement of the inner housing relative to the outer housing.

6. The system of claim 1, further comprising:
a least one O-ring configured to provide damping for angular displacement of the inner housing relative to the outer housing.

7. The system of claim 1, further comprising:
a plurality of pressure sensors configured to measure pressures in the plurality of damping cavities.

8. The system of claim 1, further comprising:
a thrust plate that defines:
   an axial clearance between the thrust plate and a thrust runner coupled to the rotating shaft, the axial clearance configured to receive the gas;
   wherein, when the shaft is oriented substantially horizontally, operation of the rotating machine creates a thrust force;
   wherein, when the shaft is oriented substantially vertically, operation of the rotating machine and the shaft weight combine to create the thrust force;
   wherein the axial clearance is configured to generate a counteracting force from the gas that is in the axial clearance, the counteracting force sufficient to counter-act the thrust force.

9. The system of claim 1, further comprising:
a thrust plate that defines:
   an axial clearance between the thrust plate and a thrust runner coupled to the rotating shaft, the axial clearance configured to receive the gas;
   wherein, when the shaft is oriented substantially horizontally, operation of the rotating machine creates a thrust force;
   wherein, when the shaft is oriented substantially vertically, operation of the rotating machine and the shaft weight combine to create the thrust force;
   wherein the axial clearance is configured to generate a counteracting force from the gas that is in the axial clearance, the counteracting force sufficient to maintain the axial clearance above a minimum axial dimension.

10. The system of claim 1, further comprising:
a thrust plate that defines:
   an axial clearance between the thrust plate and a thrust runner coupled to the rotating shaft, the axial clearance configured to receive the gas;
   wherein, when the shaft is oriented substantially horizontally, operation of the rotating machine creates a thrust force;
   wherein, when the shaft is oriented substantially vertically, operation of the rotating machine and the shaft weight combine to create the thrust force;
   wherein the axial clearance is configured to generate a counteracting force from the gas that is in the axial clearance, the counteracting force sufficient to influence an axial position of the shaft within the bearing system.

11. The system of claim 1, further comprising:
a thrust plate that defines:
   an axial clearance between the thrust plate and a thrust runner coupled to the rotating shaft, the axial clearance configured to receive the gas;
   wherein, when the shaft is oriented substantially horizontally, operation of the rotating machine creates a thrust force;
   wherein, when the shaft is oriented substantially vertically, operation of the rotating machine and the shaft weight combine to create the thrust force;
   wherein the axial clearance is configured to generate a counteracting force from the gas that is in the axial clearance, the counteracting force sufficient to be greater than or equal to a magnetic axial force generated between a rotating ring permanent magnet having a first polarity, the rotating ring permanent magnet configured to magnetically couple with a stationary ring permanent magnet having an opposite second polarity.

12. The system of claim 1, further comprising:
a thrust plate that defines:
   an axial clearance between the thrust plate and a thrust runner coupled to the rotating shaft;
   a plurality of axial feedholes configured to route the gas to the axial clearance;
   and
   a plurality of generally radial channels configured to route the gas to the plurality of liner damping apertures, the plurality of damping cavities, and/or the plurality of liner gas exhaust orifices;
   wherein, when the shaft is oriented substantially horizontally, operation of the rotating machine creates a thrust force;
   wherein, when the shaft is oriented substantially vertically, operation of the rotating machine and the shaft weight combine to create the thrust force;
   wherein the axial clearance is configured to generate a counteracting force from the gas that is in the axial clearance, the counteracting force sufficient to counter-act the thrust force.

13. The system of claim 1, further comprising:
the thrust runner.

14. The system of claim 1, further comprising:
a condensate drain configured to be fluidically coupled to the annular plenum.

15. The system of claim 1, further comprising:
a condensate plug configured to:
   receive condensate from a condensate drain; and
   provide a first resistance to flow of the gas and a second resistance to flow of the condensate, the first resistance higher than the second resistance.

16. The system of claim 1, further comprising:
a condensate plug configured to:
   receive condensate from a condensate drain configured to be fluidically coupled to the annular plenum; and
   define a flow channel having a length-to-equivalent diameter $(L/D_e)$ ratio of from approximately 1,000 to approximately 5,000.

17. The system of claim 1, further comprising:
a condensate plug configured to:
   receive condensate from a condensate drain configured to be fluidically coupled to the annular plenum;
   offer a first resistance to flow of the gas and a second resistance to flow of the condensate, the first resistance higher than the second resistance; and/or
   define a flow channel having a length-to-equivalent diameter $(L/D_e)$ ratio of from approximately 1,000 to approximately 5,000;
wherein the condensate plug comprises a rod threaded into a sleeve, a gap between threads of the rod and threads of the sleeve defining the flow channel.

18. The system of claim 1, further comprising:
a rotating magnetic ring configured to magnetically interface with a stationary permanent magnet ring to produce a repulsive axial force or an attractive axial force.

19. The system of claim 1, wherein:
the system provides an amplification factor at critical speeds of between 1.0 and 4.0.

* * * * *